United States Patent
Ogata

(10) Patent No.: US 6,185,254 B1
(45) Date of Patent: Feb. 6, 2001

(54) DECODER, IMAGE ENCODING APPARATUS, IMAGE DECODING APPARATUS, IMAGE TRANSMITTING METHOD, AND RECORDING MEDIUM

(75) Inventor: Masami Ogata, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 08/932,076

(22) Filed: Sep. 17, 1997

(30) Foreign Application Priority Data

| Sep. 20, 1996 | (JP) | 8-249450 |
| Sep. 30, 1996 | (JP) | 8-278817 |
| Apr. 4, 1997 | (JP) | 9-086253 |
| Nov. 8, 1998 | (JP) | 8-312814 |

(51) Int. Cl.$^7$ .................................................. H04N 7/18
(52) U.S. Cl. .................... 375/240.19; 348/404; 348/405; 348/407; 348/420
(58) Field of Search ................... 348/404, 405, 348/406, 420, 421, 416, 415, 413; 375/240, 240.19

(56) References Cited

U.S. PATENT DOCUMENTS

| 5,420,636 | * | 5/1995 | Kojima | 348/405 |
| 5,712,686 | * | 1/1998 | Cho | 348/405 |
| 5,731,837 | * | 3/1998 | Hurst, Jr. | 348/405 |
| 5,754,235 | * | 5/1998 | Urano et al. | 348/405 |
| 5,822,005 | * | 10/1998 | Horne | 348/405 |
| 5,936,669 | * | 8/1999 | Niesen | 348/405 |

* cited by examiner

Primary Examiner—Andy Rao
(74) Attorney, Agent, or Firm—Frommer Lawrence & Haug, LLP.; William S. Frommer

(57) ABSTRACT

A decoder de-quantizes quantized data and performs a predetermined operation on the de-quantized data. The decoder de-quantizes the data with a quantizing step size different from the step size used in the quantizing operation. An image encoding apparatus encodes input image data. The encoding apparatus has a motion-vector detector which detects a motion vector from the input image data. A predicted image generator generates predicted image data of the image to be encoded in accordance with the detected motion vector. A differential-image generator generates differential-image data between the predicted image data and the image to be encoded. A transformer transforms the differential-image data to obtain a transform coefficient for the differential-image data. A quantizer quantizes the transfer coefficient to obtain a quantized transfer coefficient. A de-quantizer de-quantizes the quantized transfer coefficient to reproduce the transfer coefficient. A transform-coefficient corrector corrects the reproduced transfer coefficient to obtain a corrected transfer coefficient. An inverse-transformer inverse-transforms the corrected transfer coefficient to reproduce the differential-image data. An image adder adds the predicted image data to the reproduced differential-image data to reproduce the image data for the predicted image data of the image to be encoded.

45 Claims, 30 Drawing Sheets

FIG. 7

| L=0 | L=1<br>B=HL | L=2<br>B=HL | L=3<br>B=HL |
|---|---|---|---|
| L=1<br>B=LH | L=1<br>B=HH | | |
| L=2<br>B=LH | | L=2<br>B=HH | |
| L=3<br>B=LH | | | L=3<br>B=HH |

FIG. 19
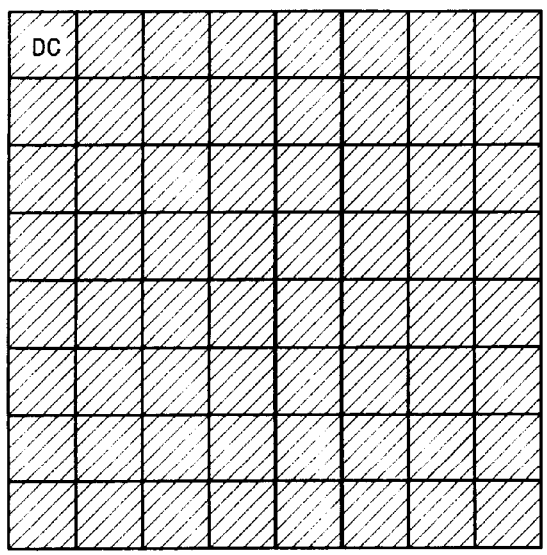
 0.67
FIG. 20
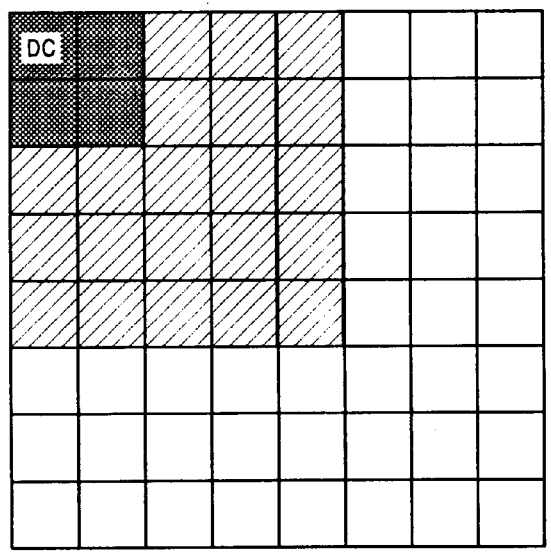
0.8
0.67
0.5

DECODER, IMAGE ENCODING APPARATUS, IMAGE DECODING APPARATUS, IMAGE TRANSMITTING METHOD, AND RECORDING MEDIUM

BACKGROUND OF THE INVENTION

1. Field of the Invention

The present invention broadly relates to a data processing method and apparatus, an image encoding method and apparatus, an image decoding method and apparatus, an image transmitting method, and recording mediums. More particularly, the invention relates to a data processing method and apparatus, an image encoding method and apparatus, an image decoding method and apparatus, an image transmitting method, and recording mediums, in all of which quantizing errors are minimized, and temporal jitter of motion pictures, which is caused by a change in the phase of ringing noise between frames, is suppressed.

2. Description of the Related Art

In quantization processing executed to order to perform digital-data compression, input data c is, in general, quantized according to the following equation:

$$c' = int(c/Q + 0.5) \quad (1)$$

where Q indicates the quantization step size, and int represents the function for rounding down the remainder. In contrast, to perform de-quantization processing for reproducing the data, the following equation is calculated.

$$c'' = c' \times Q \quad (2)$$

The foregoing two processing operations expressed by the respective equations (1) and (2) are referred to as "linear quantization" and "linear de-quantization", respectively. The value nQ (n is an integer) of the reproduced data designates, as illustrated in FIG. 25, the center value of each of the ranges incremented by the respective quantizing steps, and corresponds to all the input data in a range represented by the following expression.

$$nQ - Q/2 \leq c < nQ + Q/2 \quad (3)$$

On the other hand, nonlinear quantizing processing is executed on the data having a large frequency distribution, such as the one shown in FIG. 26. More specifically, as shown in FIG. 27, a larger level of distribution frequency is quantized by a smaller quantizing step in order to decrease the overall quantizing errors.

FIG. 28 is a schematic diagram illustrating an example of conventional motion-picture encoding apparatuses. In this encoding apparatus 1, motion-picture data to be encoded is input into a frame memory 12 via an input terminal and stored therein. A motion-vector detector 11 detects a motion vector v from the input image stored in the frame memory 12 generally by performing block matching by a block unit of non-overlapping and small 16×16-pixel regions (hereinafter referred to as "the macroblocks"). Alternatively, to obtain higher precision a matching operation by a half-pixel unit may be sometimes performed.

A motion compensator 20, which contains a frame memory 21, predicts the individual pixel values of the image to be encoded from the wholly encoded and partially decoded previous image which is stored in the frame memory 21. The predicted value I'[i,j,t] of the pixel I[i,j,t] located at the position (i,j) of the image which was input at time t is determined from the motion vector v=(vx(i,j,t), vy(i,j,t)) by the following equation:

$$I'[i,j,t] = (I[i',j',t-T] + I[i'+1,j',t-T] + I[i',j'+1,t-T] + I[i'+1,j'+1,t-T])/4 \quad (4)$$

wherein i' and j' are expressed by the following equation:

$$i' = int(i + vx(i,j,t)T)$$

$$j' = int(j + vy(i,j,t)T)$$

wherein T indicates a difference between the time at which the image I to be predicted was input and the time at which the previous image stored in the frame memory 12 was input; (I[i',j',t−T], I[i'+1,j',t−T], I[i',j'+1,t−T], and I[i'+1,j'+1, t−T] on the right side of equation (4) represent the pixel values stored in the frame memory 21; and int(x) designates the maximum integer not greater than x.

A differential-image generator 13 calculates a difference between the pixel value to be encoded and the predicted value obtained by the motion compensator 20, and then calculates the sum s of the absolute values of the differences within each macroblock according to the following equation:

[Mathematical equation 1]

$$S = \sum_{(i,j) \in MB_{pq}} |I[i,j,t] - [I'[i,j,t]| \quad (5)$$

wherein $MB_{pq}$ indicates a macroblock designated by pq. When the value of equation (5) is smaller than the threshold T1, each differential value corresponding to the designated macroblock is output. In contrast, when the value of equation (5) is equal to or greater than the threshold T1, the pixel value to be encoded rather than the differential value is output. The macroblocks from which the pixel values are output are referred to as "the intra-macroblocks", while the macroblocks other than the intra-macroblocks are referred to as "the inter-macroblocks".

The flag f representing whether or not the macroblock to be output is an intra-macroblock is transmitted to a variable-length encoder/multiplexer 16 and is multiplexed with a bit stream, and is further sent to an image adder 19.

A discrete cosine transform (DCT) unit 14 performs two-dimensional DCT on a 8×8-pixel block. Then, a quantizer(Q) 15 quantizes the DCT coefficient c obtained by the DCT unit 14 by using a suitable step size Q according to the following equation.

$$c' = int(c/Q) \quad (6)$$

The quantized DCT coefficient c' is sent to the variable-length encoder/multiplexer 16 and de-quantizer ($Q^{-1}$) 17. The de-quantizer 17 de-quantizes the DCT coefficient c' according to the following equation by using the same step size Q as the one used in the quantizer 15.

$$c'' = c' \times Q \quad (7)$$

Inverse DCT (IDCT) is conducted on the de-quantized data which is expressed by a 8×8-pixel block by an inverse discrete cosine transform (IDCT) unit 18.

The image adder 19 reproduces the pixel value from the data output from the IDCT unit 18 and the predicted value output from the motion compensator 20 in accordance with the flag f transmitted from the differential-image generator 13. If the flag f represents an intra-macroblock, the data output from the IDCT unit 18 represents the pixel value. Accordingly, no processing is performed in the image adder 19. In contrast, if the flag f indicates an inter-macroblock, the image adder 19 adds the predicted value from the motion compensator 20 to the data from the IDCT unit 18, and then reproduces the pixel value. The reproduced pixel value is transmitted to the motion compensator 20 and stored in the frame memory 21.

The variable-length encoder/multiplexer 16 variable-length encodes and multiplexes the following elements: the DCT coefficient c quantized by the quantizer 15, the motion vector v detected by the motion-vector detector 11, and the flag f obtained by the differential-image generator 13. The multiplexed data in the form of a bit stream is then transmitted to a predetermined transmission line 22 or recorded on a recording medium 23.

FIG. 29 is a block diagram illustrating an example of a motion-picture decoding apparatus which receives the bit stream output from the motion-picture encoding apparatus 1 shown in FIG. 28 and decodes the received bit stream. The decoding apparatus 31 receives the bit stream from the predetermined transmission line 22 or the recording medium 23 via an input terminal. Then, a de-multiplexer/variable-length decoder 41 variable-length decodes and demultiplexes the bit stream encoded and multiplexed by the variable-length encoder/multiplexer 16 of the encoding apparatus 1, thereby reproducing the quantized DCT coefficient, the motion vector v, and the flag f from the bit stream. The reproduced DCT coefficient is transmitted to the de-quantizer 42; the motion vector v is sent to a motion compensator 45; and the flag f is fed to an image adder 44.

The de-quantizer ($Q^{-1}$) 42 and an IDCT unit 43 of the decoder 31 are similar to the de-quantizer ($Q^{-1}$) 17 and the IDCT unit 18 of the encoding apparatus 1, and de-quantization processing expressed by equation (7) is performed in the de-quantizer ($Q^{-1}$) 42, and IDCT is then conducted in the IDCT unit 43.

The image adder 44, which is similar to the image adder 19 of the encoding apparatus 1, reproduces the bit stream to obtain the pixel value of the reproduced image in the following manner. If the flag f transmitted from the de-multiplexer/variable-length decoder 41 indicates an intra-macroblock, the image adder 44 reproduces the data output from the IDCT unit 43. On the other hand, if the flag f represents an inter-macroblock, the adder 44 adds the predicted value generated by the motion compensator 45 to the data from the IDCT unit 43. The resulting pixel value is stored in a frame memory 46 provided for the motion compensator 45 in order to create a predicted image.

The motion compensator 45, which is similar to the counterpart of the encoding apparatus 1, predicts the individual pixel values of the image to be decoded with the use of the motion vector v obtained by the variable-length decoder 41 and the image stored in the frame memory 46 of the motion compensator 45.

FIGS. 30 and 31 respectively illustrate a motion-picture encoding apparatus 1 and a motion-picture decoding apparatus 31, both of which utilize the wavelet transform method. In the encoding apparatus 1 and the decoding apparatus 31 shown in FIGS. 30 and 31, the DCT unit 14, and the IDCT units 18 and 43 shown in FIGS. 28 and 29 are substituted for a wavelet transformer 51 and inverse wavelet transformers 52 and 61, respectively. The other components, such as the quantizer 15, the de-quantizers 17 and 42, and the motion compensators 20 and 45 are similar to those illustrated in FIGS. 28 and 29.

The differential-image generator 13, as well as the generator 13 shown in FIG. 28, determines whether the flag f represents an intra-macroblock or an inter-macroblock. If, however, it is determined that the macroblock is an intra-macroblock, the differential-image generator 13 illustrated in FIG. 30, unlike the generator 13 shown in FIG. 28, calculates the average ave of the pixel values within the macroblock according to the following equation:
[Mathematical equation 2]

$$ave = \frac{\sum_{(i,j) \in MB_{pq}} I[i, j, t]}{N_{MB_{pq}}} \qquad (8)$$

where $N_{MB_{pq}}$ represents the number of pixels (16×16 pixels) within the macroblock.

A differential value obtained by subtracting the average ave from each of the pixel values within the macroblock is output to a wavelet transformer 51 from the differential-image generator 13. Meanwhile, the average ave of the intra-macroblock is transmitted to the variable-length encoder/multiplexer 16. The average ave is also sent to the image adder 19 and is used for reproducing the image.

The image adder 19 reproduces the pixel values of an intra-macroblock by adding the macroblock average ave output from the differential-image generator 13 to the data which has been inverse-wavelet transformed by the inverse wavelet transformer 52. Conversely, the image adder 19 reproduces the pixel values of an inter-macroblock in a manner similar to the image adder 19 used in the encoding operation performed by utilizing the DCT method. The differential-image generator 13 outputs a difference between the input pixel value and the predicted value of a predicted image output from the motion compensator 20, and the differential value is wavelet-transformed in the wavelet transformer 51. The image adder 19 then adds the predicted value generated by the motion compensator 20 to the data which has been inverse-wavelet transformed by the inverse-wavelet transformer 52, thereby reproducing the pixel values.

It should be noted that a decoding operation similar to the operation discussed above is executed by the inverse-wavelet transformer 61, the image adder 44, and the motion compensator 45 of the motion-picture decoding apparatus 31.

An example of the configuration of the wavelet transformer 51 is shown in FIG. 32. The image data I[i,j] input from the differential-image generator 13 is transmitted to an analyzing horizontal low-pass filter 71 and an analyzing horizontal high-pass filter 101 so as to perform frequency-band division on the input data in the horizontal direction of the image. As the above-described filters 71 and 101, linear filters having coefficients, such as those represented by FIGS. 33A and 33B, respectively, may be used.

The analyzing filters employed in the wavelet division, such as those shown in FIG. 32, and the synthesizing filters used in the wavelet synthesizing, such as those illustrated in FIG. 34, which will be explained later, are configured to completely or approximately satisfy the following equations, respectively:

$$H0(-z)F0(z)+H1(-z)F1(z)=0 \qquad (9)$$

$$H0(z)F0(z)+H1(z)F1(z)=2z-L \qquad (10)$$

where H0(z), H1(z), F0(z), and F1(z) respectively designate the transfer function of analyzing low-pass filters 71, 74, 77, 80, 87, and 104, the transfer function of analyzing high-pass filters 75, 82, 84, 89, 101 and 106, the transfer function of synthesizing low-pass filters 123, 129, 143, 152, 158 and 162, and the transfer function of synthesizing high-pass filters 127, 147, 149, 156, 166 and 168; and L indicates a certain integer. It is thus expected that the signal synthesized in accordance with the foregoing conditions wholly or approximately coincides with the input signal which has not undergone band-pass division processing. The coefficients provided for the synthesizing low-pass filters and the synthesizing high-pass filters shown in FIG. 34 are respectively shown in FIGS. 35A and 35B by way of example.

Referring back to FIG. 32, the analyzing low-pass filter 71 extracts a horizontal low-frequency-band signal, which indicates a low-frequency component in the horizontal direction, from the input image data I[i,j], and outputs the extracted signal to a horizontal sub-sampling unit 72. The sub-sampling unit 72 reduces the data every other sample according to the following equation:

$$X[i',j']=X[i,j], i'=i/2 \quad (11)$$

where X equals L.

A memory 73 is a storage device formed of a plurality of line memory units in which the data required for the analyzing vertical low-pass filter 74 or the vertical high-pass filter 75 is stored. The memory 73 has the same number of line memory units as the taps of the filter used in the filtering operation in the vertical direction. If the filters having coefficients shown in FIGS. 33A and 33B, for example, are used as the low-pass filter 74 and the high-pass filter 75, respectively, nine line memory units are provided in accordance with a larger number of taps of the low-pass filter having.

In order to conduct the frequency-band division in the vertical direction of the image, the vertical low-pass filter 74 and the vertical high-pass filter 75 respectively perform low-pass filtering and high-pass filtering on the data stored in the memory 73. The same types of filters used in the horizontal filtering operation, i.e., the horizontal low-pass filter 71 and the horizontal high-pass filter 101, may be used for the vertical filtering operation.

In the meantime, the analyzing horizontal high-pass filter 101 separates a horizontal high-frequency-band signal H[i,j] from the image data I[i,j]. Then, a horizontal sub-sampling unit 102 samples the separated signal according to the foregoing equation (11) (wherein X equals H) and stores the sampled data in a memory 103. The low-pass filter 104 and the high-pass filter 106, in a manner similar to the low-pass filter 74 and the high-pass filter 75, respectively, perform low-pass filtering and high-pass filtering on the data output from the memory 103 in the vertical direction of the image.

A signal LL[i',j] output from the vertical low-pass filter 74 and a signal LH[i',j] output from the high-pass filter 75, both signals being extracted from the horizontal low-frequency-band signal L[i',j] output from the horizontal sub-sampling unit 72, and a signal HL[i',j] output from the low-pass filter 104 and a signal HH[i',j] output from the high-pass filter 106, both signals being separated from the horizontal high-frequency-band signal H[i',j] output from the horizontal sub-sampling unit 102, are respectively transmitted to vertical sub-sampling units 76, 91, 105 and 107. The sub-sampling units 76, 91, 105 and 107 then execute sub-sampling processing on the respective signals, i.e., reduces the signals every other line, in the vertical direction of the image according to the following equation:

$$X[i',j']=X[i',j], j'=j/2 \quad (12)$$

where X equals LL, LH, HL or HH.

The frequency-band signals LH[i',j'], HL[i',j'], and HH[i', j'], which have been respectively sub-sampled by the units 91, 105 and 107, are directly output to the quantizer 15 from the wavelet transformer 51.

Moreover, the signal LL[i',j'], which has been low-pass filtered both in the horizontal and vertical directions, output from the vertical sub-sampling unit 76, is input into the second-level horizontal low-pass filter 77 and the horizontal high-pass filter 84. Subsequently, the operations similar to the processing executed in the above-described horizontal low-pass filter 71, the horizontal sub-sampling unit 72, the memory 73, the vertical low-pass filter 74, the vertical high-pass filter 75, and the vertical sub-sampling units 76 and 91, are respectively performed in the horizontal low-pass filter 77, the horizontal sub-sampling unit 78, the memory 79, the vertical low-pass filter 80, the vertical high-pass filter 82, and the vertical sub-sampling units 81 and 83.

Further, the operations similar to the processing executed in the foregoing horizontal high-pass filter 101, the horizontal sub-sampling unit 102, the memory 103, the vertical low-pass filter 104, the vertical high-pass filter 106, and the vertical sub-sampling units 105 and 107 are respectively performed in the horizontal high-pass filter 84, the sub-sampling unit 85, the memory 86, the vertical low-pass filter 87, the vertical high-pass filter 89, and the vertical sub-sampling units 88 and 90. As a consequence, the band-divided signals LLLL[i",j"], LHLL[i",j"], HLLL[i",j"], and HHLL[i",j"] are generated. The output signals LLLL[i",j"], LHLL[i",j"], HLLL[i",j"], HHLL[i",j"], and LH[i',j'], HL[i', j'], HH[i',j'] are used as wavelet coefficients corresponding to the respective frequency bands.

Conversely, the inverse-wavelet transformer 52 (the inverse-wavelet transformer 61 is also constructed similar to the transformer 52) shown in FIG. 34 sequentially synthesizes the respective frequency-band signals output from the wavelet transformer 51 illustrated in FIG. 32, i.e, the wavelet coefficients LLLL[i",j"], LHLL[i",j"], HLLL[i",j"], and HHLL[i",j"], and LH[i',j'], HL[i',j'], HH[i',j'], thereby reproducing the image.

More specifically, the inverse-wavelet transformer 52 first synthesizes the signals LLLL[i",j"], LHLL[i",j"], HLLL[i", j"], and HHLL[i",j41 ], which have been band-divided by the two levels of filters of the wavelet transformer 51. The input signals are stored in memory devices 121, 125, 141 and 145, respectively, each formed of a plurality of line memory units. The memory devices 121, 125, 141 and 145 are provided with line memory units having the same numbers as the lines required for the subsequent stage of the low-pass filter 123, the high-pass filter 127, the low-pass filter 143, and the high-pass filter 147, respectively. The specific number of lines required for the vertical filter is a half of "the number of taps plus one" if the vertical filter has an odd number of taps, while the number of lines equal to a half of the number of taps is needed if the vertical filter has an even number of taps. If the low-pass filter, such as the one shown in FIG. 35A, is used, two line memory units are disposed in the subsequent level of the low-pass filter 123. The numbers of line memory units required for the memory devices 121, 125, 141, 145, 150, 154, 160 and 164 illustrated in FIG. 34 are different from the numbers of memory devices 73, 79, 86 and 103 provided for the wavelet transformer 51 shown in FIG. 32 because up-sampling processing in the vertical direction is executed in a stage between the memory devices and the filters of the inverse-wavelet transformer 52, which operation will be explained in detail below.

Vertical up-sampling units 122, 126, 142 and 146 insert one line containing no data between the adjacent input lines according to the following equation (13).

[Mathematical equation 3]

$$X[i'', j''] = \begin{cases} X[i'', j'] & \dots \ j' = 2 \times j'' \\ 0 & \dots \ j' = 2 \times j'' + 1 \end{cases} \quad (13)$$

$$X = LLLL, LHLL, HLLL \text{ or } HHLL$$

The respective frequency-band signals LLLL[i",j"], LHLL[i",j"], HLLL[i",j"], and HHLL[i",j"], which have been up-sampled in the up-sampling units 122, 126, 142 and 146, are interpolated in the vertical direction by the low-pass filter 123, the high-pass filter 127, the low-pass filter 143, and the high-pass filter 147. The interpolated signals output from the low-pass filter 123 and the high-pass filter 127 are transmitted to an adder 124, while the interpolated signals output form the low-pass filter 143 and the high-pass filter 147 are sent to an adder 144. The synthesizing filters 123, 127, 143 and 147, as well as the corresponding analyzing filters 80, 82, 87 and 89, should be configured to satisfy the foregoing equations (9) and (10). If the coefficients shown in FIG. 33 are used for the analyzing filters, the filters having the coefficients illustrated in FIG. 35 should be used as the synthesizing filters.

The interpolated frequency-band signals LLLL[i",j"] and LHLL[i",j"] are added in the adder 124 and output to a horizontal up-sampling unit 128. Meanwhile, the interpolated signals HLLL[i",j"] and HHLL[i",j"] are added in the adder 144 and output to a horizontal up-sampling unit 148. The up-sampling units 128 and 148 perform the up-sampling operation on the respective signals in the horizontal direction according to the following equation (14).

[Mathematical equation 4]

$$X[i', j'] = \begin{cases} X[i'', j'] & \dots \ i' = 2 \times i'' \\ 0 & \dots \ i' = 2 \times i'' + 1 \end{cases} \quad (14)$$

$$X = LLL \text{ or } HLL$$

Thereafter, the horizontal low-pass filter 129 and the high-pass filter 149 conduct filtering operations in the horizontal direction on the respective signals which have been sampled by the up-sampling units 128 and 148, respectively. The filtered signals are then interpolated in the filters 129 and 149, and the interpolated signals are further added in an adder 140. The low-frequency-band signal LL[i',j'] is thus reproduced.

Subsequently, the components from the memory device 150 to the adder 159 execute processing on the reproduced signal LL[i',j'], and the input frequency-band signals LH[i',j'], HL[i',j'], and HH[i',j'] in a manner similar to the operation performed by the components from the above-described memory device 121 to the adder 140. As a consequence, an image signal I[i,j] is thus reproduced.

As illustrated in FIG. 25, a known de-quantizer performs a de-quantizing operation with a quantizing step of the same size as the quantizing step used in the quantizer. Accordingly, the reproduced value is generally positioned at the center of each of the ranges incremented by the quantizing steps (de-quantizing steps). In the above type of "linear quantization", quantizing errors can be minimized when the input data is, as shown in FIG. 36, uniformly distributed in each of the ranges incremented by the quantizing steps.

In contrast, in motion-picture encoding the DCT coefficients and the wavelet coefficients used for a motion-compensated differential image have a distribution, as illustrated in FIG. 26, in which the frequency sharply drops with the increased absolute value, and its local distribution is also nonuniform, as shown in FIG. 37. Particularly when data is encoded with a low bit rate, a large size Q of quantizing step is used. Accordingly, the absolute values of the most coefficients range from 0 to Q. As a consequence, a greater number of quantizing errors occur in the nonuniform data in the conventional linear quantizer and de-quantizer.

To overcome the above drawback, "nonlinear quantization" and "nonlinear de-quantization" in which a smaller quantizing step is used for a larger level of distribution frequency are performed on the data having a large distribution. This method on one hand decreases quantizing errors, but on the other hand increases the generated amount of bits. Moreover, nonlinear quantizing and de-quantizing processing is very complicated.

Further, the motion-picture encoding/decoding apparatus shown in FIGS. 28 and 29 which utilizes both DCT and motion compensation is employed for the international standard methods, such as MPEG1, MPEG2, and H.263, and is most widely being used. However, since processing is executed by a block unit, a great amount of block noise is generated particularly with a low bit rate.

Conversely, the generation of block noise can be suppressed because processing is executed by a frame unit in the known motion-picture encoding and decoding apparatus utilizing wavelet transform shown in FIGS. 30 and 31. Ringing noise, however, which is unique to wavelet encoding in a flat (non-edge) region, is produced, and the ringing phase further changes in every frame when a motion picture is reproduced, thereby generating temporal jitter of motion pictures.

Moreover, the wavelet encoding method encounters the following problem. If one quantized coefficient is. much larger than the other coefficients among the coefficients of different frequency bands in the same spatial position, the pattern of a wavelet filter disadvantageously emerges on a decoded image. Flickering of the filter pattern also appears if a coefficient much larger than the other coefficients unstably appears temporally. As a consequence, the quality of a displayed image is degraded.

SUMMARY OF THE INVENTION

Accordingly, in view of the above background, it is an object of the present invention to decrease quantizing errors without increasing the amount of data.

It is another object of the present invention to prevent the generation of block noise and to inhibit the generation of ringing noise, and further to suppress a change in the ringing phase in every frame, which would otherwise cause temporal jitter of motion pictures.

In order to achieve the above objects, according to one aspect of the present invention, there is provided a decoder for de-quantizing quantized data and performing a predetermined operation on the de-quantized data, the apparatus comprising: receiving means which receives the quantized data; de-quantizing means which de-quantizes the quantized data with a quantizing step size different from a step size used in the quantizing operation; and output means which outputs the de-quantized data.

According to another aspect of the present invention, there is provided an image encoding apparatus for encoding input image data, the apparatus comprising: motion-vector detecting means which detects a motion vector from the input image data; predicted-image-data generating means which generates predicted image data of the image to be encoded in accordance with the detected motion vector; differential-image generating means which generates differential-image data between the predicted image data and the image to be encoded; transform means which transforms the differential-image data generated by the differential-image generator so as to obtain a transform coefficient for the differential-image data; quantizing means which quantizes the transform coefficient so as to obtain a quantized transform coefficient; de-quantizing means which de-quantizes the quantized transform coefficient so as to reproduce the transform coefficient; transform-coefficient correcting means which corrects the reproduced transform coefficient so as to obtain a corrected transform coefficient; first inverse-transform means which inverse-transforms the corrected transform coefficient so as to reproduce first differential-image data; and image adding means which adds the predicted image data to the reproduced first differential-image data so as to reproduce the image data for the predicted image data of the image to be encoded.

According to still another aspect of the present invention, there is provided an image encoding apparatus for encoding input image data, comprising: motion-vector detecting means which detects a motion vector from the input image data; predicted-image-data generating means which generates predicted image data of the image to be encoded in accordance with the detected motion vector; differential-image generating means which generates differential-image data between the predicted image data and the image to be encoded; transform means which transforms the differential-image data so as to obtain a transform coefficient for the differential-image data; quantizing means which quantizes the transform coefficient so as to obtain a quantized transform coefficient; de-quantizing means which de-quantizes the quantized transform coefficient so as to reproduce the transform coefficient; inverse-transform means which inverse-transforms the transform coefficient so as to reproduce the differential-image data; differential-image correcting means which corrects the reproduced differential-image data so as to generate corrected differential-image data; and image adding means which adds the predicted image data to the reproduced differential-image data so as to reproduce the image data for the predicted image data of the image to be encoded.

According to a further aspect of the present invention, there is provided an image transmitting method for encoding input image data and transmitting the encoded data, the method comprising the steps of: detecting a motion vector from the input image; generating predicted image data of the image to be encoded in accordance with the detected motion vector; generating differential-image data between the predicted image data and the image to be encoded; transforming the differential-image data so as to obtain a transform coefficient for the differential-image data; quantizing the transform coefficient so as to obtain a quantized transform coefficient; de-quantizing the quantized transform coefficient so as to reproduce the transform coefficient; correcting the reproduced transform coefficient so as to obtain a corrected transform coefficient; inverse-transforming the corrected transform coefficient so as to reproduce the differential-image data; adding the predicted image data to the reproduced differential-image data so as to reproduce the image data for the predicted image data of the image to be encoded; and transmitting the quantized transform coefficient and the encoded data including the motion vector.

According to a further aspect of the present invention, there is provided an image transmitting method for encoding input image data and transmitting the encoded data, the method comprising the steps of: detecting a motion vector from the input image; generating predicted image data of the image to be encoded in accordance with the detected motion vector; generating differential-image data between the predicted image data and the image to be encoded; transforming the differential-image data so as to obtain a transform coefficient for the differential-image data; quantizing the transform coefficient so as to obtain a quantized transform coefficient; de-quantizing the quantized transform coefficient so as to reproduce the transform coefficient; inverse-transforming the transform coefficient so as to reproduce the differential-image data; correcting the reproduced differential-image data so as to generate corrected differential-image data; adding the predicted image data to the reproduced differential-image data so as to reproduce the image data for the predicted image data of the image to be encoded; and transmitting the encoded data including at least the quantized transform coefficient and the motion vector.

According to a further aspect of the present invention, there is provided an image decoding apparatus for decoding encoded image data which includes at least a quantized transform coefficient and a motion vector, the apparatus comprising: separating means which separates the quantized transform coefficient and the motion vector; de-quantizing means which de-quantizes the quantized transform coefficient so as to reproduce a transform coefficient; transform-coefficient correcting means which corrects the reproduced transform coefficient so as to obtain a corrected transform coefficient; first inverse-transform means which inverse-transforms the corrected transform coefficient so as to reproduce first differential-image data; predicted-image-data generating means which generates predicted image data in accordance with the motion vector; and image adding means which adds the predicted image data to the reproduced differential image data.

According to a further aspect of the present invention, there is provided an image decoding apparatus for decoding encoded image data which includes at least a quantized transform coefficient and a motion vector, the apparatus comprising: separating means which separates the quantized transform coefficient and the motion vector; de-quantizing means which de-quantizes the quantized transform coefficient so as to reproduce a transform coefficient; inverse-transform means which inverse-transforms the transform coefficient so as to reproduce differential-image data; differential-image correcting means which corrects the reproduced differential-image data so as to obtain corrected differential-image data; predicted-image-data generating means which generates predicted image data in accordance with the motion vector; and image adding means which adds the predicted image data to the corrected differential-image data.

According to a further aspect of the present invention, there is provided a recording medium decodable by a decoder, the recording medium including encoded data which contains at least a quantized transform coefficient and a motion vector, the encoded data being generated by the steps of: detecting the motion vector from input image; generating predicted image data of the image to be encoded in accordance with the detected motion vector; generating differential-image data between the predicted image data and the image to be encoded; transforming the differential-image data so as to obtain a transform coefficient for the differential-image data; quantizing the transform coefficient so as to obtain a quantized transform coefficient; de-quantizing the quantized transform coefficient so as to reproduce the transform coefficient; correcting the reproduced transform coefficient so as to obtain a corrected transform coefficient; inverse-transforming the corrected transform coefficient so as to reproduce the differential-image data; adding the predicted image data to the reproduced differential-image data so as to reproduce the image data for the predicted image data of the image to be encoded; and transmitting the encoded data including at least the quantized transform coefficient and the motion vector.

According to a further aspect of the present invention, there is provided a recording medium decodable by a decoder, the recording medium including encoded data which contains at least a quantized transform coefficient and a motion vector, the encoded data being generated by the steps of: detecting the motion vector from input image; generating predicted image data of the image to be encoded in accordance with the detected motion vector; generating differential-image data between the predicted image data and the image to be encoded; transforming the differential-image data so as to obtain a transform coefficient for the differential-image data; quantizing the transform coefficient so as to obtain a quantized transform coefficient; de-quantizing the quantized transform coefficient so as to reproduce the transform coefficient; inverse-transforming the transform coefficient so as to reproduce the differential-image data; correcting the reproduced differential-image data so as to obtain corrected differential-image data; adding the predicted image data to the reproduced differential-image data so as to reproduce the image data for the predicted image data of the image to be encoded; and transmitting the encoded data including at least the quantized transform coefficient and the motion vector.

BRIEF DESCRIPTION OF THE DRAWINGS

FIG. 7 illustrates the frequency level and the frequency band in a wavelet domain;

FIG. 19 illustrates an example of attenuation coefficients used for DCT coefficients;

FIG. 20 illustrates another example of attenuation coefficients used for DCT coefficients;

FIG. 33, which is comprised of FIGS. 33A and 33B, illustrates the coefficients used in the analyzing filters shown in FIG. 32;

FIG. 35, which is comprised of FIGS. 35A and 35B, illustrates the coefficients used in the synthesizing filters shown in FIG. 34;

DESCRIPTION OF THE PREFERRED EMBODIMENTS

Figure 1:
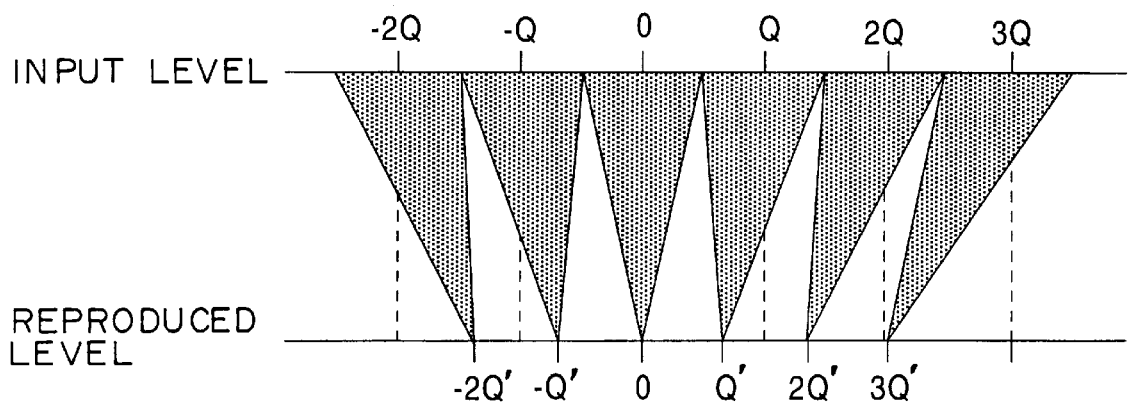
FIG. 1 illustrates the relationship between the input level and the reproduced level resulting from the de-quantizing operation performed in a motion-picture encoding apparatus and a motion-picture decoding apparatus according to a first embodiment of the present invention.

A first embodiment of the present invention is configured in a manner similar to the known art shown in FIGS. 28 through 31. In this embodiment, however, the quantizing step Q' used in the de-quantizer 17 of the motion-picture encoding apparatus 1 and in the de-quantizer 42 of the decoding apparatus 31 is determined by multiplying the quantizing step Q used in the quantizer 15 of the encoding apparatus 1 by a predetermined coefficient a ($0.0 \leq a \leq 1.0$), which is expressed by the following equation.

$$Q' = aQ \quad (15)$$

Namely, de-quantizing processing is executed with the quantizing step Q' according to the following equation.

$$c''' = c' \times Q' \quad (16)$$

It should be noted that the quantizing step Q' may also be referred to as "the de-quantizing step Q' if it is necessary that the quantizing step used in the de-quantizers 17 and 42 be differentiated from the quantizing step used in the quantizer 15.

Figure 2:
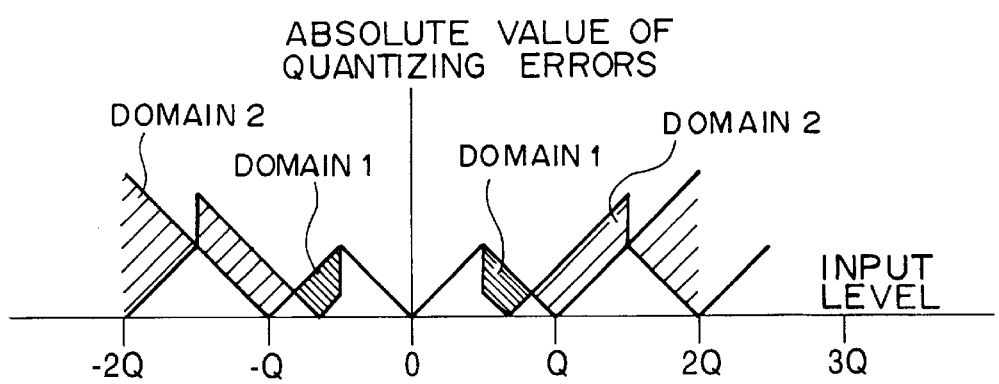
FIG. 2 illustrates the relationship between the input level and quantizing errors resulting from the de-quantizing operation.

FIG. 1 illustrates the relationship between the input data and the reproduced data obtained by performing the de-quantizing operation expressed by equation (16). FIG. 2 illustrates a comparison between the quantizing errors generated by the de-quantizing operation expressed by equation (16) and the quantizing errors produced by the known de-quantizing operation expressed by equation (2). In FIG. 2, the horizontal axis represents the input data, while the vertical axis designates the absolute value of the quantizing errors. The domain 1 indicates a region in which there are less quantizing errors caused by the quantizing operation by equation (16) than the operation by equation (2), while the domain 2 depicts a region in which there are less quantizing errors generated by the de-quantizing operation by equation (2) than the operation by equation (16). FIG. 2 reveals that the overall quantizing errors can be reduced to a smaller level when the de-quantizing operation by equation (16) is used on condition that most values of input data, such as transform coefficients used for a differential image, are smaller than Q.

Namely, data is reproduced with the use of a smaller quantizing step for the data containing smaller levels of frequency distribution. This makes it possible to reduce quantizing errors without increasing the amount of generated bits.

Figure 3:
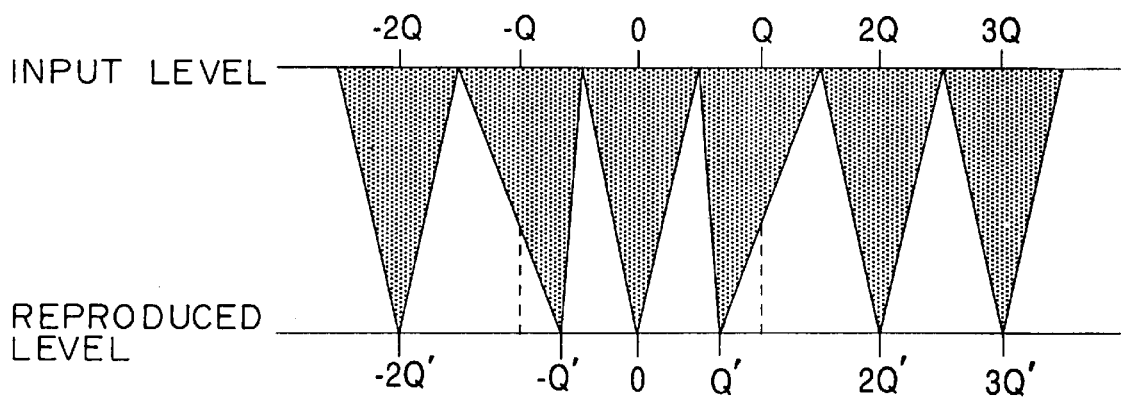
FIG. 3 illustrates an example of the relationship between the input level and the reproduced level when a threshold is used.

In order to reduce the domain 2 shown in FIG. 2 in which quantizing errors are increased, the following modification may be made. The quantizing step Q' obtained by equation (15) may be used only when the quantized data c' to be de-quantized is smaller than a predetermined threshold TH (which is two in the example shown in FIG. 3). On the other hand, if the quantized data c' is equal to or greater than the threshold TH, the normal quantizing step Q (which is used in the quantizer 15) may be employed. Although a desired value may be set in the above threshold TH, the minimum value c' to satisfy the following expression may be used as the threshold TH.

$$c'Q' < c'Q - Q/2 \quad (17)$$

In this manner, the quantizing step is changed from Q to Q' only when the quantized values satisfy certain conditions, such as the threshold H, thereby decreasing quantizing errors with higher precision.

Figure 4:
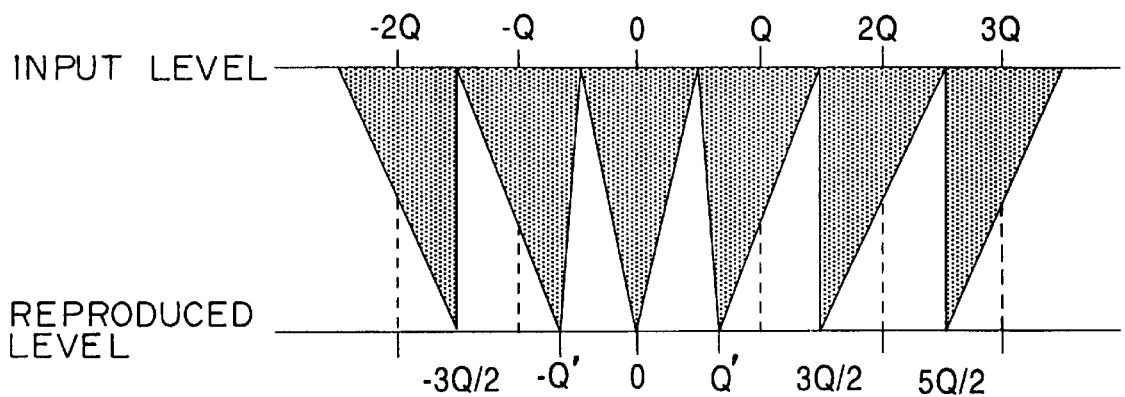
FIG. 4 illustrates another example of the relationship between the input level and the reproduced level when a threshold is used.

Alternatively, if the quantized data c' is greater than a predetermined threshold TH (which is two in the example shown in FIG. 4), as illustrated in FIG. 4, the value (c'Q−Q/2) which is equal to the minimum possible value of the pre-quantized data may be output in place of the value c'Q de-quantized by the quantizing step Q. As described above, only certain ranges of values de-quantized by the quantizing step may be used, thereby reducing quantizing errors with higher accuracy.

Figure 5:
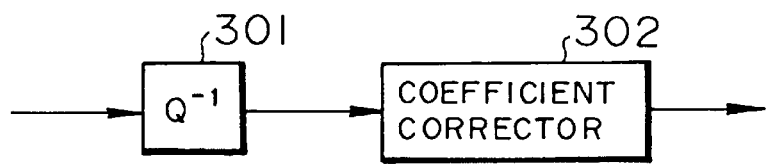
FIG. 5 is-a block diagram illustrating the configuration of a data processing device used in a motion-picture encoding apparatus or a motion-picture decoding apparatus according to a second embodiment of the present invention.

A second embodiment of the present invention is implemented, as illustrated in FIG. 5, by adding a coefficient corrector to the de-quantizer explained in the first embodiment. More specifically, a coefficient corrector 302 is provided at the stage subsequent to a linear de-quantizer 301 (corresponding to the de-quantizer 17 or 42 shown in FIGS. 28 through 31). The de-quantizer 301 de-quantizes the quantized value according to equation (2) with the same size of quantizing step Q as the one used in the quantizer 15. Then, the de-quantized value c" is multiplied by an attenuation coefficient a in the coefficient corrector 302 as expressed by the following equation.

$$c''' = a \times c' \quad (18)$$

In the above configuration shown in FIG. 5, if the threshold is used to decrease quantizing errors to a greater level, the output value c" can be multiplied by the attenuation coefficient a only when the input value is smaller than a predetermined threshold. Alternatively, the value (c"−Q/2) which is equal to the minimum possible value of the pre-quantized data can be output when the input value is greater than a predetermined threshold.

Figure 6:
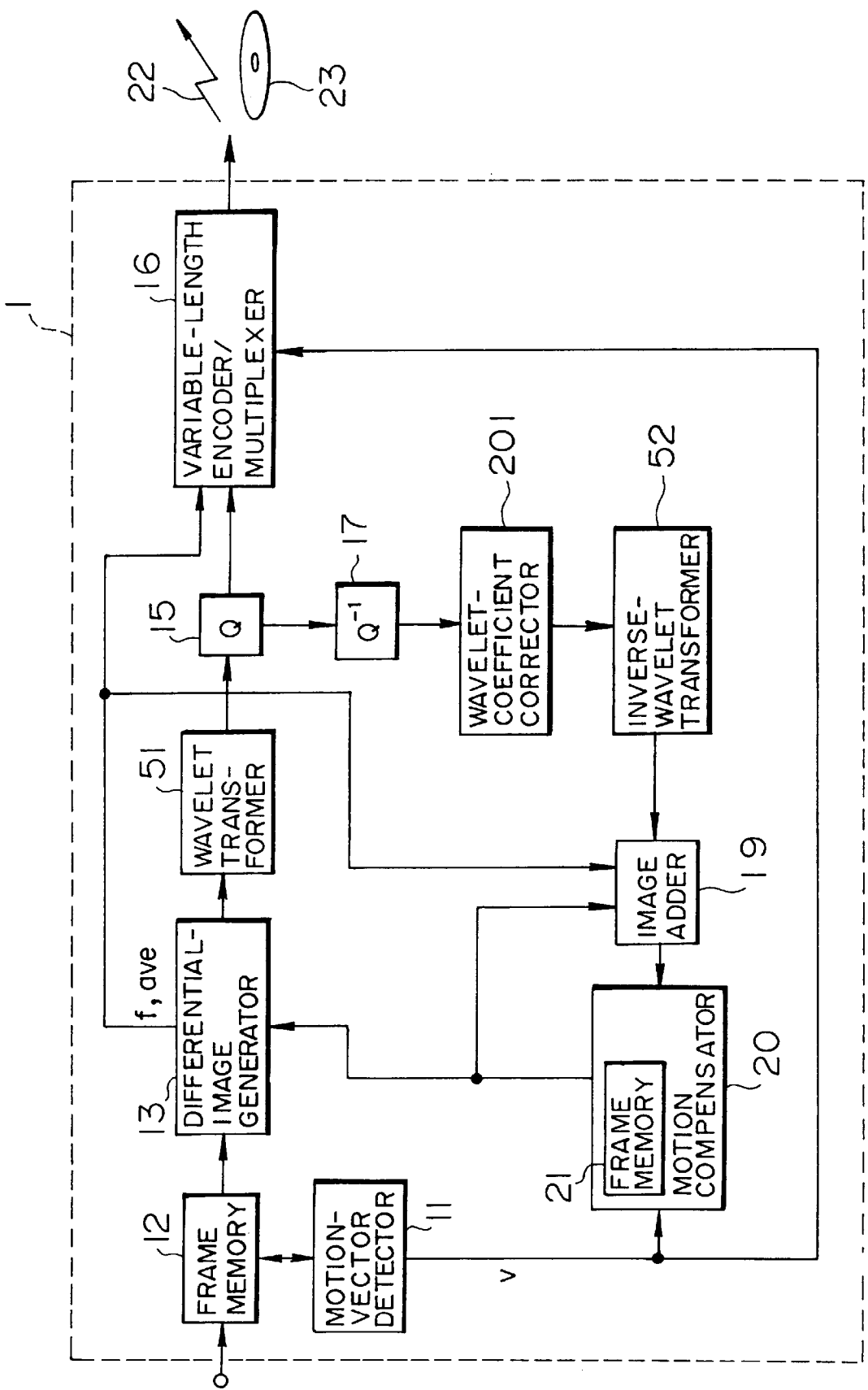
FIG. 6 is a block diagram illustrating the configuration of a motion-picture encoding apparatus according to a third embodiment of the present invention.

A third embodiment of the present invention is shown in FIG. 6. The elements having functions similar to those shown in FIG. 30 are designated by like reference numerals, and an explanation thereof will thus be omitted.

Figure 30:
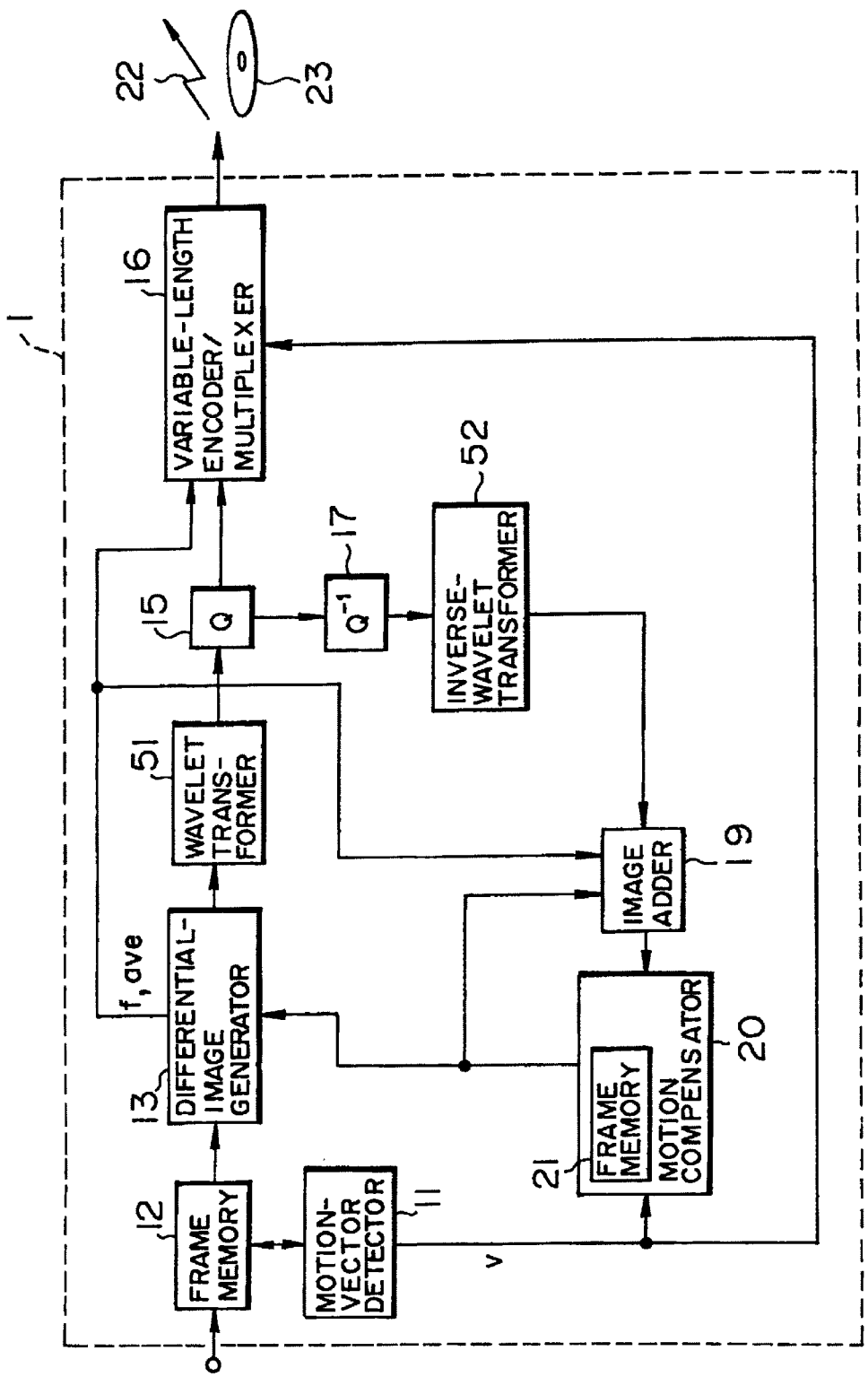
FIG. 30 is a block diagram illustrating the configuration of another known motion-picture encoding apparatus.

Although the configuration of the third embodiment is basically similar to that shown in FIG. 30, the former differs from the latter in that a wavelet coefficient corrector 201 is interposed between the de-quantizer 17 and the inverse-wavelet transformer 52. In this wavelet coefficient corrector 201, the following correction is made if the absolute value of the wavelet coefficient c" de-quantized by the de-quantizer 17 according to equation (7) is smaller than a threshold T2:

$$c''' = a[L] \times c'' \quad (19)$$

where a[L] indicates a real number in a range expressed by $0 \leq a[L] \leq 1$. In equation (19), the coefficient c" is attenuated by the attenuation coefficient a[L]. L designates the frequency level at which the coefficient c" is located, and accordingly, an appropriate attenuation coefficient may be used in accordance with the frequency level at which the coefficient c" is placed.

As discussed above, the absolute value of a wavelet coefficient which is smaller than a predetermined threshold can be attenuated to minimize blurring of images and also to inhibit temporal jitter of motion pictures caused by ringing noise.

FIG. 7 illustrates the relationship between the frequency levels L and the divided frequency bands in the wavelet domain. In this embodiment, the wavelet domain is divided into three levels. B(=LH,HL,HH) shown in FIG. 7 represents the respective divided frequency bands. For example, the band HL indicates a band which has been high-pass filtered in the horizontal direction and low-pass filtered in the vertical direction, where vertical edges are likely to appear. The band LH designates a band which has been low-pass filtered in the horizontal direction and high-pass filtered in the vertical direction, where horizontal edges tend to occur.

As the attenuation coefficient a[L], the same coefficients may be used as follows for all the divided bands of a motion-compensated inter-frame.

a[0]=0.67
a[1]=0.67
a[2]=0.67
a[3]=0.67

If the same attenuation coefficients are used for all the frequency bands in the above manner, the wavelet coefficient corrector 201 may be disposed immediately after the inverse-wavelet transformer 52 as far as the threshold T is infinite so as to multiply a differential image by an attenuation coefficient. Then, the same result as in a case in which the wavelet coefficient corrector 201 is inserted between the de-quantizer 17 and the inverse-wavelet transformer 52 can be obtained.

Alternatively, since a level change in response to the degree of motion is greater in higher-frequency components than in lower-frequency components, the following attenuation coefficients a[L] may be set in order to attenuate the lower-frequency components to a greater level, which are originally less noticeable even if they are attenuated.

a[0]=0.2
a[1]=0.4
a[2]=0.8
a[3]=1.0

This determination makes it possible to minimize blurring of images and to also suppress temporal jitter of motion pictures caused by ringing noise.

Further, the following attenuation coefficients a[L] may be employed to attenuate the intermediate-frequency components to a greater level, in which humans have high sensitivity in response to temporal changes.

a[0]=0.8
a[1]=0.2
a[2]=0.5
a[3]=1.0

With this modification, blurring of images can be suppressed to a minimal level, and temporal jitter of motion pictures can be effectively inhibited.

In contrast, the following attenuation coefficients may be used for intra-frames which do not undergo motion compensation.

a[0]=1.0
a[1]=1.0
a[2]=0.9
a[3]0.8

Although in the above embodiment no distinction is made between the attenuation coefficients for luminance components and those for chrominance components, different attenuation coefficients may be used. For example, the foregoing attenuation coefficients a[0]=1.0, a[1]=1.0, a[2]=0.9, a[3]=0.8 may be used for luminance components of an intra-frame, and the following attenuation coefficients may be employed for chrominance components.

a[0]=1.0
a[1]=0.9
a[2]=0.8
a[3]=0.8

Figure 8A:
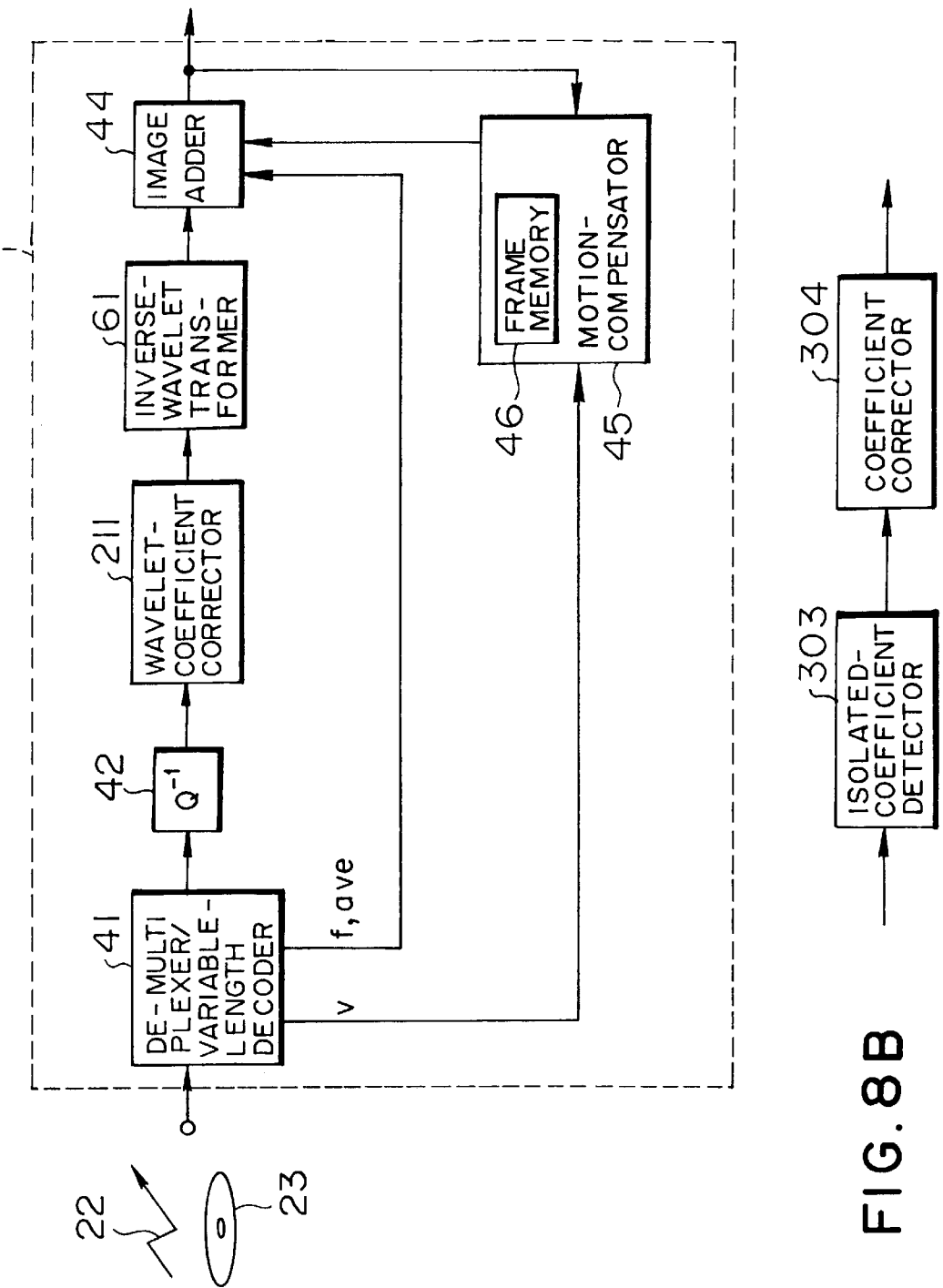
FIG. 8A is a block diagram illustrating the configuration of a motion-picture decoding apparatus according to the third embodiment of the present invention.

FIG. 8A is a block diagram illustrating the configuration of a motion-picture decoding apparatus 31 which decodes the bit stream output from the encoding apparatus 1 shown in FIG. 6. The elements corresponding to those shown in FIG. 31 are designated by like reference numerals, and an explanation thereof will thus be omitted.

Figure 31:
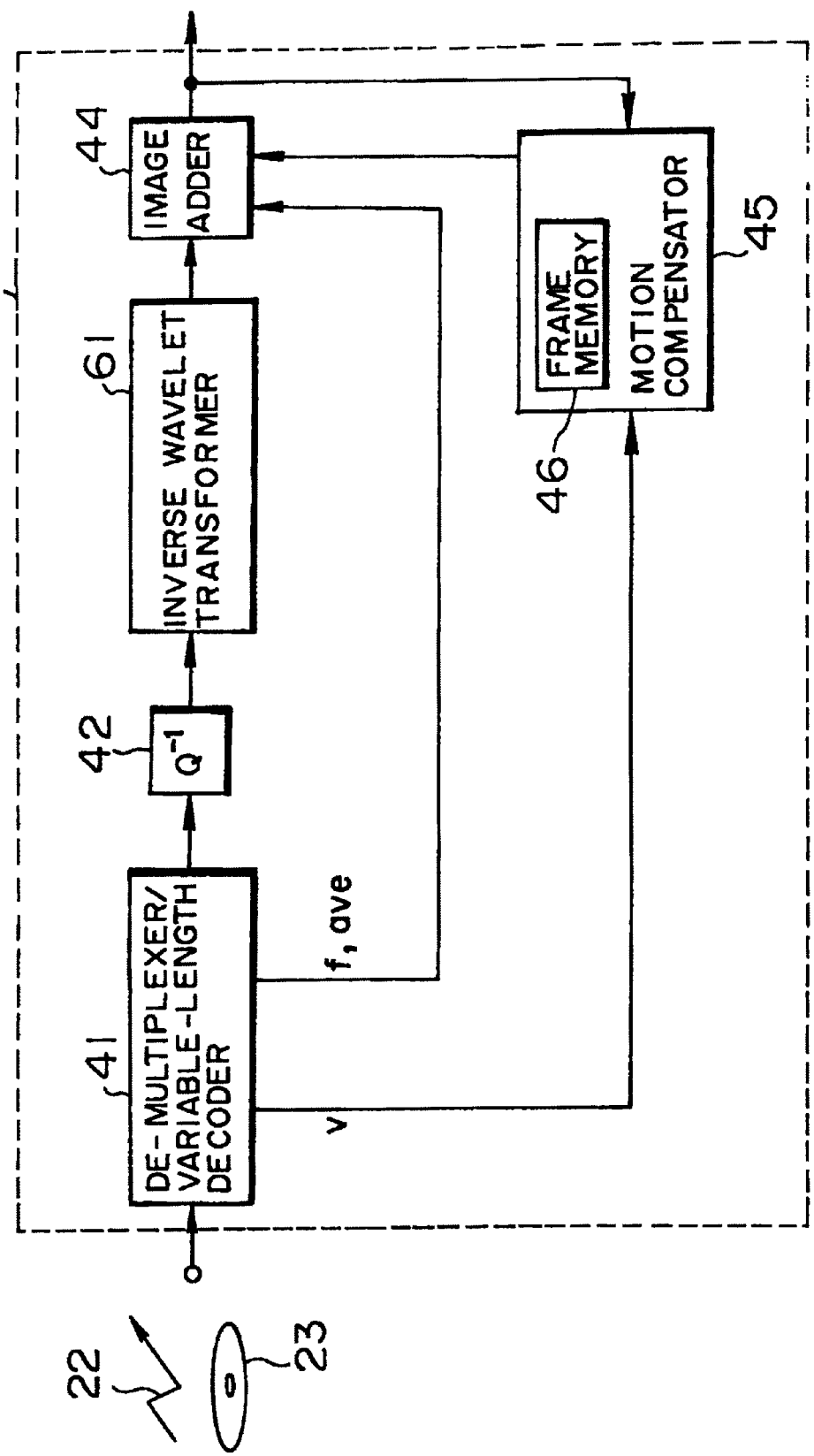
FIG. 31 is a block diagram illustrating the configuration of another known motion-picture decoding apparatus.
Figure 32:
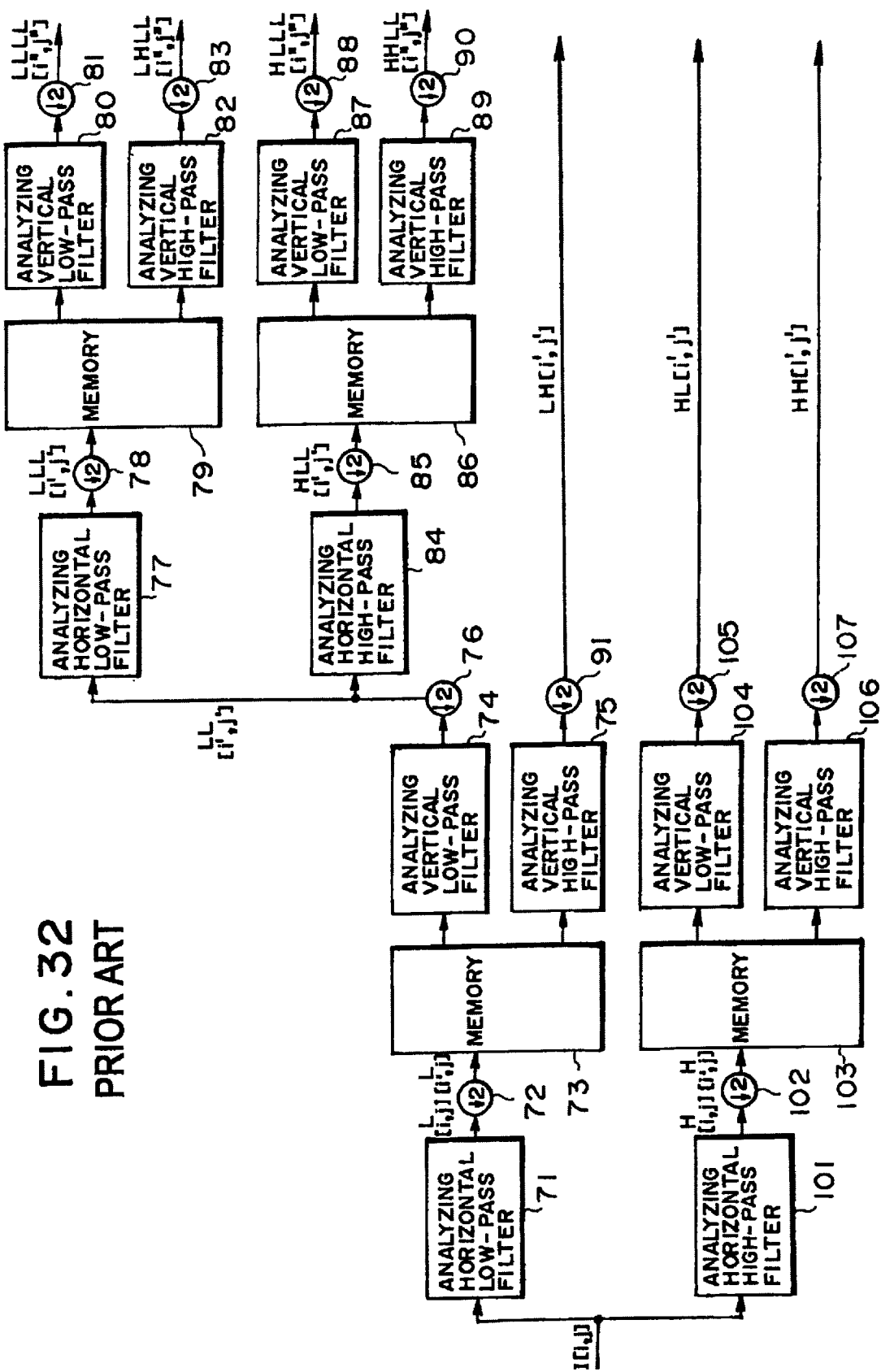
FIG. 32 is a block diagram illustrating the configuration of the wavelet transformer shown in FIG. 30.
Figure 34:
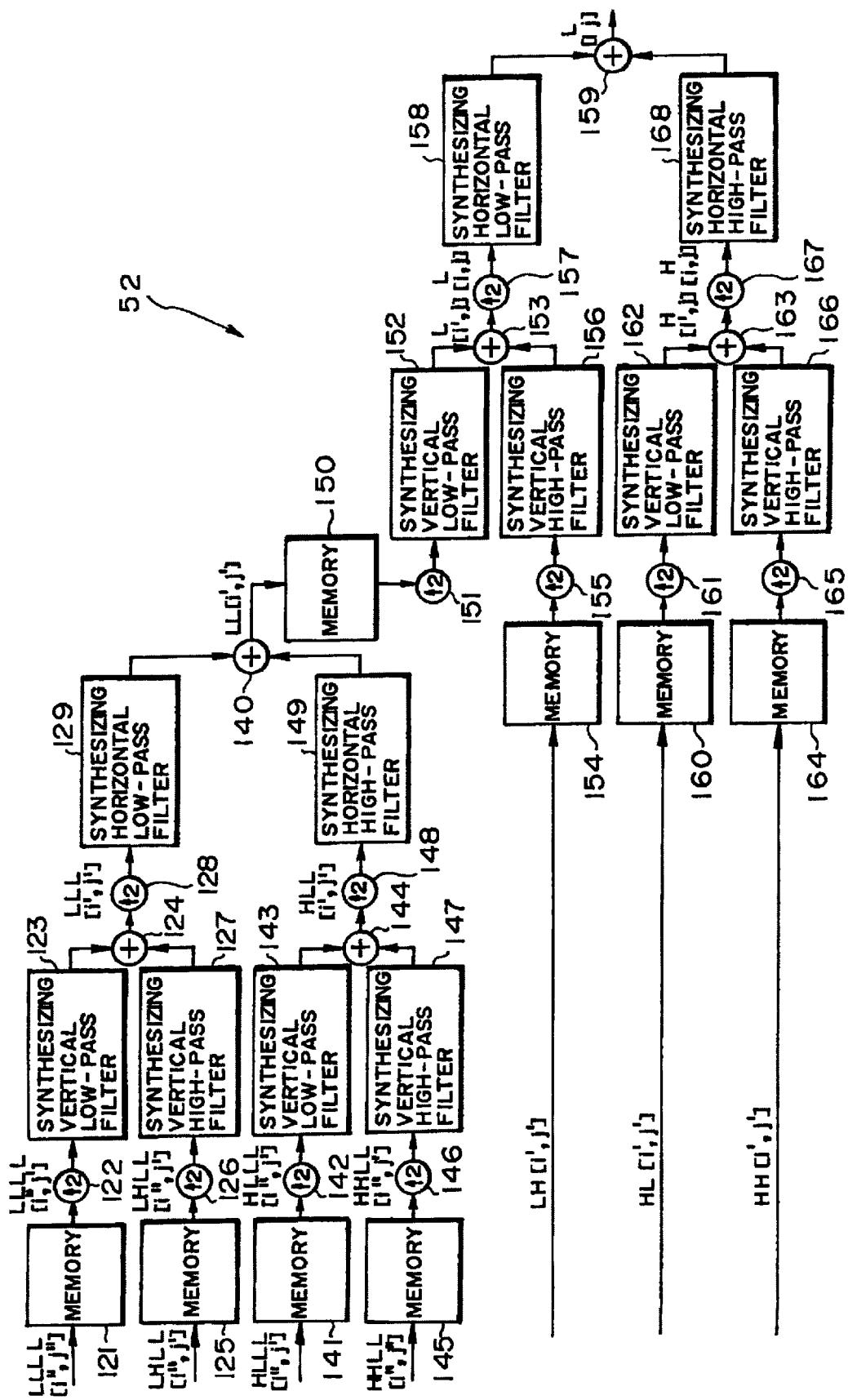
FIG. 34 is a block diagram illustrating the configuration of the inverse-wavelet transformer shown in FIG. 30.
Figure 36:
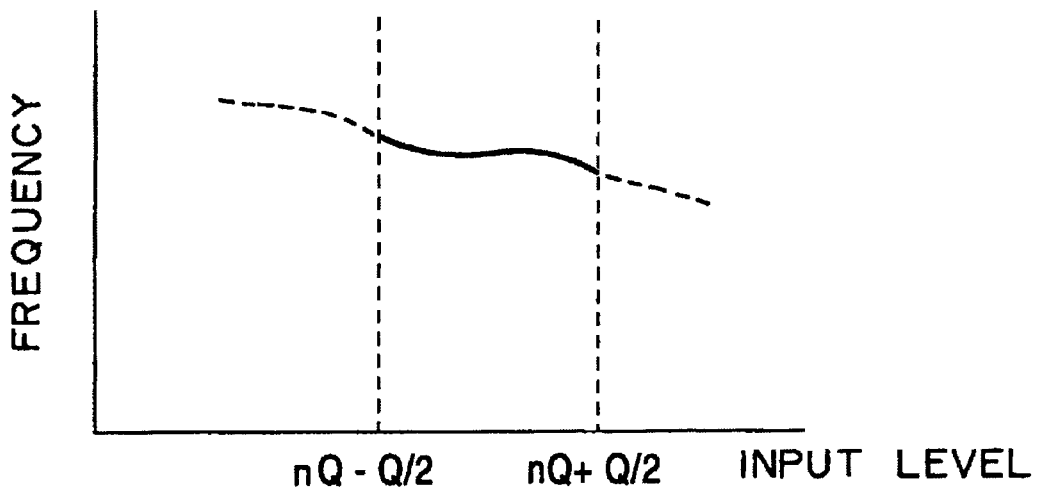
FIG. 36 illustrates the data having a locally uniform distribution.
Figure 37:
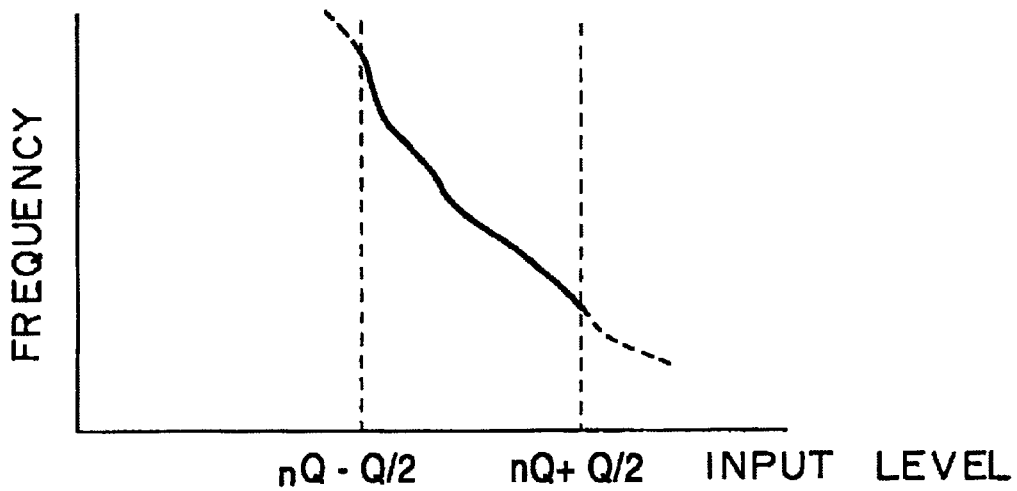
FIG. 37 illustrates the data having a locally non-uniform distribution.

The decoding apparatus 31 illustrated in FIG. 8A is different from the apparatus 31 shown in FIG. 31 in that a wavelet coefficient corrector 211 is inserted between the de-quantizer 42 and the inverse-wavelet transformer 61. The other aspects of the configuration of the apparatus 31 illustrated in FIG. 8A are similar to those of the apparatus 31 shown in FIG. 31. The wavelet coefficient corrector 211 is constructed similarly to that of the corrector 201 shown in FIG. 6 and is accordingly operated in a similar manner. Since the operation of the corrector 201 has been explained with reference to FIG. 6, an explanation of the corrector 211 will be omitted.

The configuration of a fourth embodiment of the present invention will now be described. The configuration of the fourth embodiment is fundamentally similar to that of the third embodiment shown in FIGS. 6 and 8. In the fourth embodiment, however, the wavelet coefficient correctors 201 and 211 (hereinafter referred to as "the wavelet coefficient correctors 201' and 211'") detect isolated coefficients from the coefficients in the same spatial domain and make correction expressed by the following equation (20) to the isolated coefficient:

$$c'''=b[L] \times c'' \tag{20}$$

where b[L] designates a real number in a range represented by the equation $0 \leq b[L] \leq 1$. Equation (20) indicates that the coefficient c'' is attenuated by the attenuation coefficient b[L]. L represents the frequency level at which the coefficient c''' is located, and a suitable attenuation coefficient can be used in response to the frequency level at which the coefficient c'' is placed. The following attenuation coefficients may be employed by way of example in order to give preference to lower frequency components.

b[1]=1.0
b[2]=0.8
b[3]=0.5

The coefficient b[0] is omitted in the above example because the correction expressed by the equation (20) is not performed on the coefficient c'' in the lowest frequency band, which will be explained below.

In this manner, isolated coefficients are detected from the coefficients in the same spatial domain, thereby minimizing blurring of images and also inhibiting the generation of unnatural wavelet patterns.

Figure 8B:
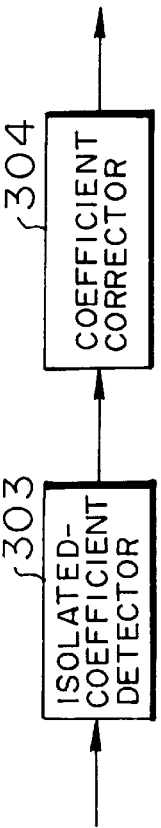
FIG. 8B is a block diagram illustrating the configuration of a wavelet-coefficient corrector used in a motion-picture encoding apparatus or a motion-picture decoding apparatus according to a fourth embodiment of the present invention.

Detection and correction of isolated coefficients performed by the wavelet coefficient correctors 201' and 211' of the fourth embodiment may be implemented by the configuration shown in FIG. 8B.

More specifically, a de-quantized wavelet-transformed coefficient is supplied to an isolated-coefficient detector 303, which then detects an isolated coefficient in each frequency level. (A detailed explanation of detection of isolated coefficients will be given later.) The detected isolated coefficient is then corrected by a coefficient corrector 304 with the use of the attenuation coefficient corresponding to the frequency level at which the isolated coefficient is located.

Detection of the isolated coefficients may be made as follows. It will now be assumed that the coefficient to be detected be represented by $c''(i,j,B,L)$. L and B designate, as shown in FIG. 7, the frequency level at which the coefficient is placed and the frequency band (B=LH,HL,HH), respectively; and (i,j) indicates the position of the coefficient within the band. When the absolute value of the designated coefficient is greater than a first threshold T3, it may be an isolated coefficient. In this case, it is further determined whether the corresponding coefficients positioned in the same spatial domain and in the same direction (in the same band) of the designated coefficient, i.e., the coefficients represented by the following expressions, are greater than a second threshold T4 (which may be equal to T3):

When $Ln<L$, $c''(i \times 2-n, j \times 2-n, B, L-n)$

When $Ln>L$, $c''(i \times 2n+di, j \times 2n+dj, B, L+n)$ (21)

$0<n$, $0 \leq di, dj < n-1$ (22)

where Ln indicates the frequency level of the corresponding coefficient; and the relationship of $L-Ln=n$ holds true.

Figure 9:
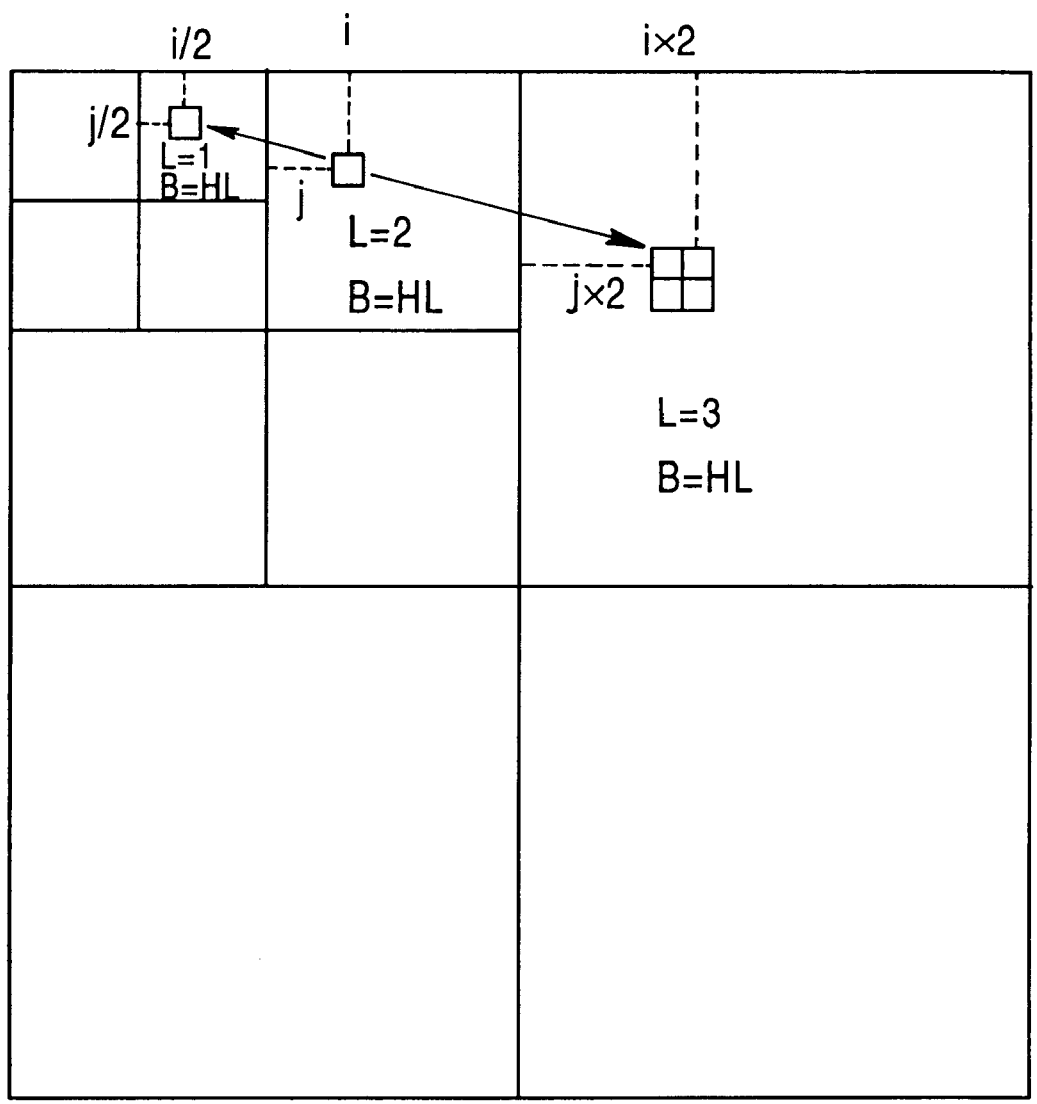
FIG. 9 illustrates the wavelet coefficients located in the same spatial position and in the same direction in each frequency level.

If all the corresponding coefficients are smaller than the threshold T4, $c''(i,j,B,L)$ is determined to be an isolated coefficient, and the attenuating operation expressed by equation (20) is performed. It should be noted that the correcting operation expressed by equation (20) is not made to the function of the lowest frequency level represented by L=0. The relationship between the coefficient $c''(i,j,B,L)$ and its corresponding coefficients is shown in FIG. 9. If a given coefficient is represented by $c''(i,j,HL,2)$, as illustrated in FIG. 9, the corresponding coefficients in the same spatial domain are such as those positioned at $(2i,2j),(i/2,j/2)$, while a corresponding coefficient in the same direction is such as the one positioned in the same band (HL).

The range n of the frequency levels used for detecting isolated coefficients may be set as desired. For example, n may be restricted to 1, in which case, the corresponding coefficients located at only one frequency level adjacent to the given coefficient may be used to determine whether the given coefficient is an isolated coefficient.

In the above embodiment, the requirements for an isolated coefficient are limited to the condition that the absolute value of the given coefficient $c''(i,j,B,L)$ should be greater than the first threshold T3. The upper limit of the threshold T3 may further be set. For example, the given coefficient may be determined to be an isolated coefficient only when it is greater than the first threshold T3 and smaller than a third threshold T5.

Alternatively, whether or not a given coefficient $c''(i,j,B,L)$ is isolated may be judged in consideration of the coefficients located in a region adjacent to the given coefficient $c''(i,j,B,L)$ in the same frequency level. Namely, in addition to the coefficients represented by expressions (21) and (22), it may be further determined whether the absolute values of the coefficients designated by the following expression (23) are greater than a fourth threshold T6 (which may be equal to the threshold T4):

$c''(i+di, j+dj, B, L)-K \leq di, dj \leq K$ (23)

where K is a constant which defines the region adjacent to the given coefficient $c''(i,j,.B,L)$. In this manner, the given coefficient $c''(i,j,B,L)$ is judged as an isolated coefficient only when all the coefficients represented by expressions (21) and (22) are smaller than the second threshold T4 and when all the coefficients indicated by expression (23) are smaller than the third threshold T5.

Figure 10:
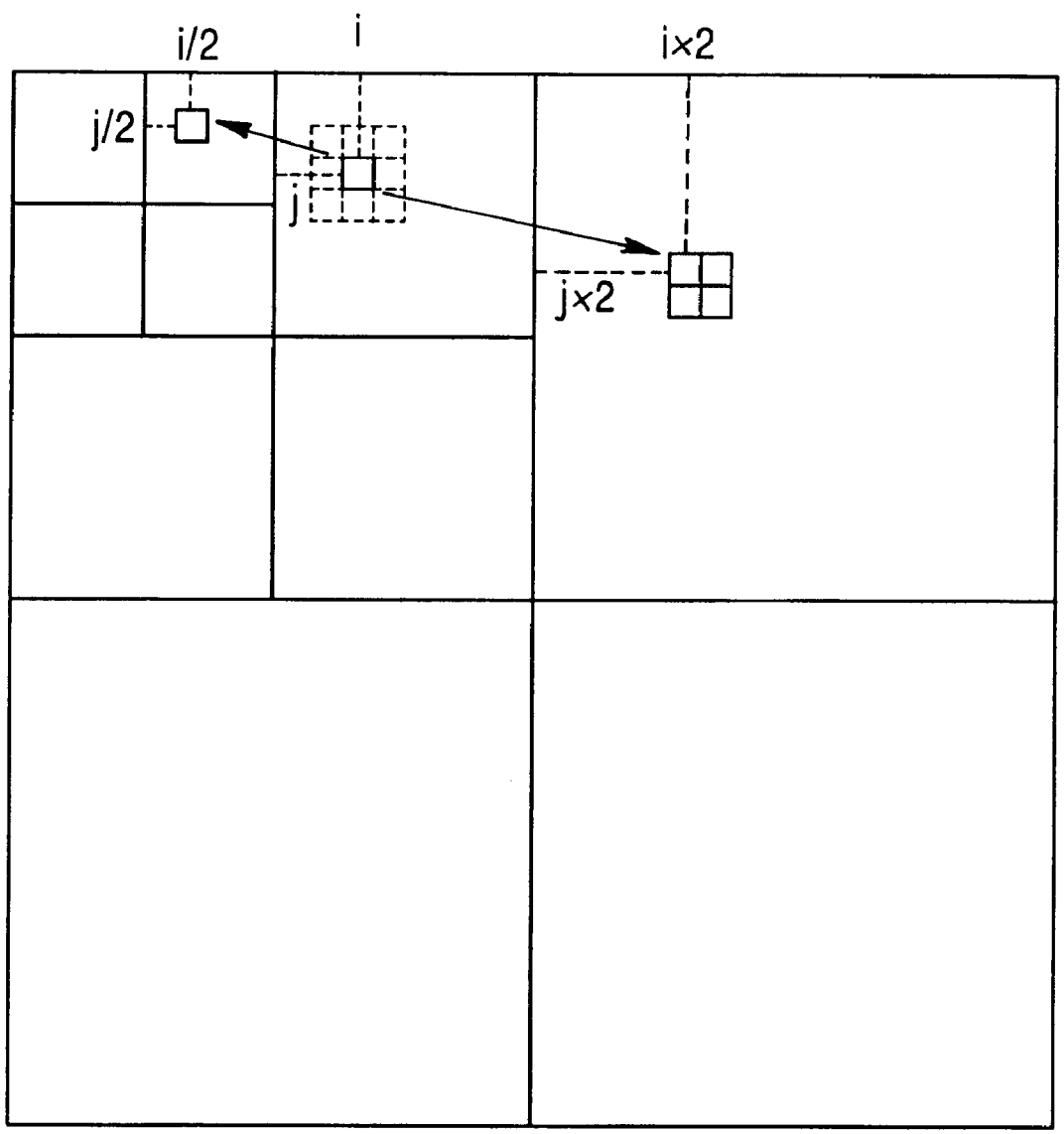
FIG. 10 illustrates the positional relationship of the coefficients used for detecting an isolated coefficient.

An example of the positional relationship of the coefficients represented by expressions (21), (22) and (23) is shown in FIG. 10. The region indicated by broken lines are adjacent regions of the given coefficient in the same frequency level, and in this example the constant K in expression (23) is 1.

If the coefficients obtained by expression (23) are used for detecting isolated coefficients, and if the number equal to or greater than N of coefficients in a region adjacent to a given coefficient are smaller than the fourth threshold T6, the given coefficient may be considered as an isolated coefficient.

Further, the thresholds T3, T4, T5 and T6 used in the detection of isolated coefficients may be set as an integral multiple of the quantizing step employed in the de-quantizer.

Moreover, the above-described correction processing used in the fourth embodiment may be combined with the operation employed in the third embodiment. More specifically, a wavelet coefficient may first be subjected to the correction processing in the third embodiment, and then, isolated coefficients may be detected and corrected in the fourth embodiment.

For example, if in the third embodiment wavelet coefficients of low-frequency components or intermediate-frequency components are considerably attenuated, there are very few isolated coefficients left in the low-frequency components or the intermediate-frequency components, and isolated coefficients only in high-frequency components are noticeable. Thus, in the fourth embodiment such isolated coefficients in high-frequency components are significantly attenuated. As a result, blurring of images can be minimized, and the generation of unnatural wavelet patterns can be effectively suppressed.

Figure 11:
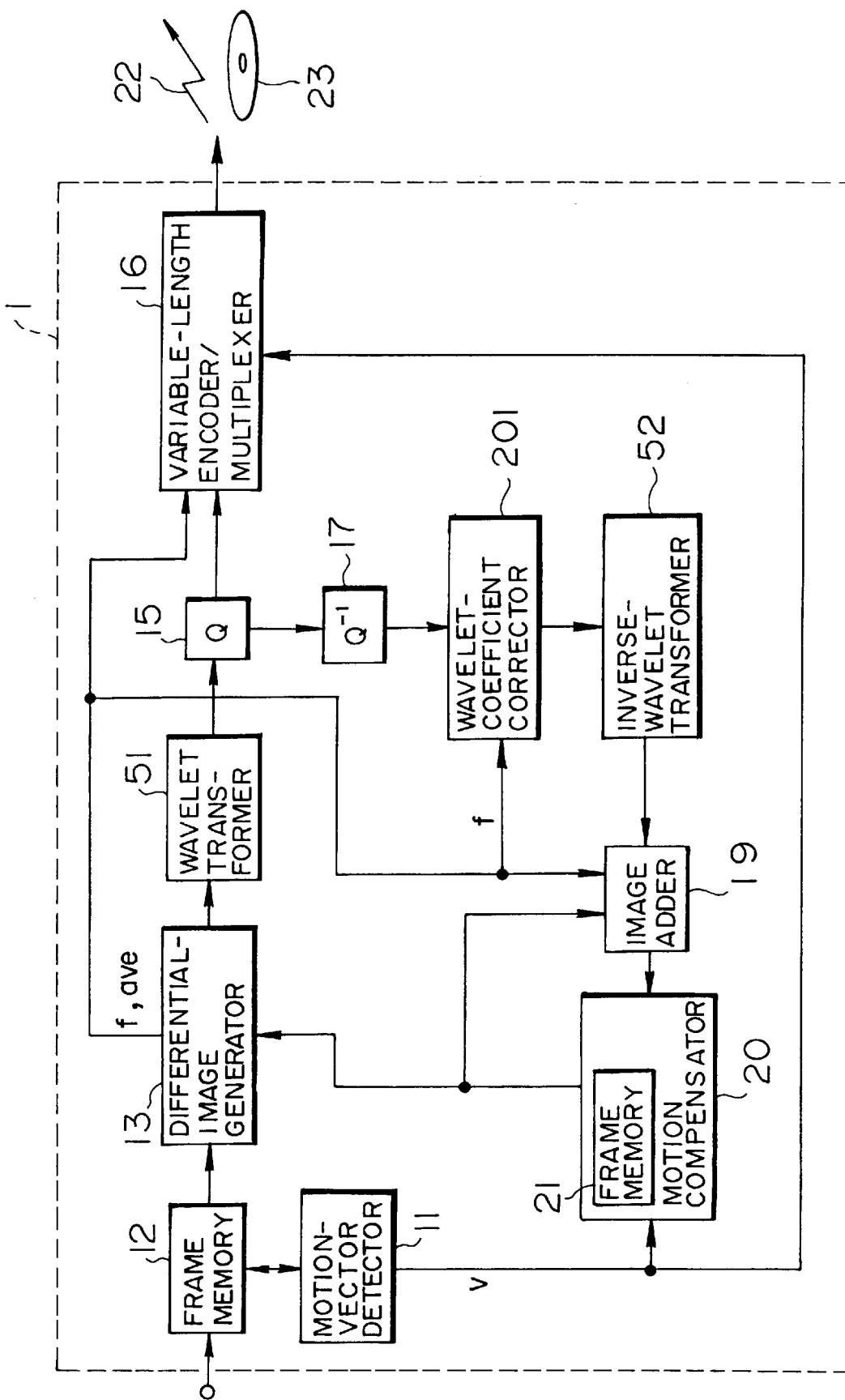
FIG. 11 is a block diagram illustrating the configuration of a motion-picture encoding apparatus according to a fifth embodiment-of the present invention.
Figure 12:
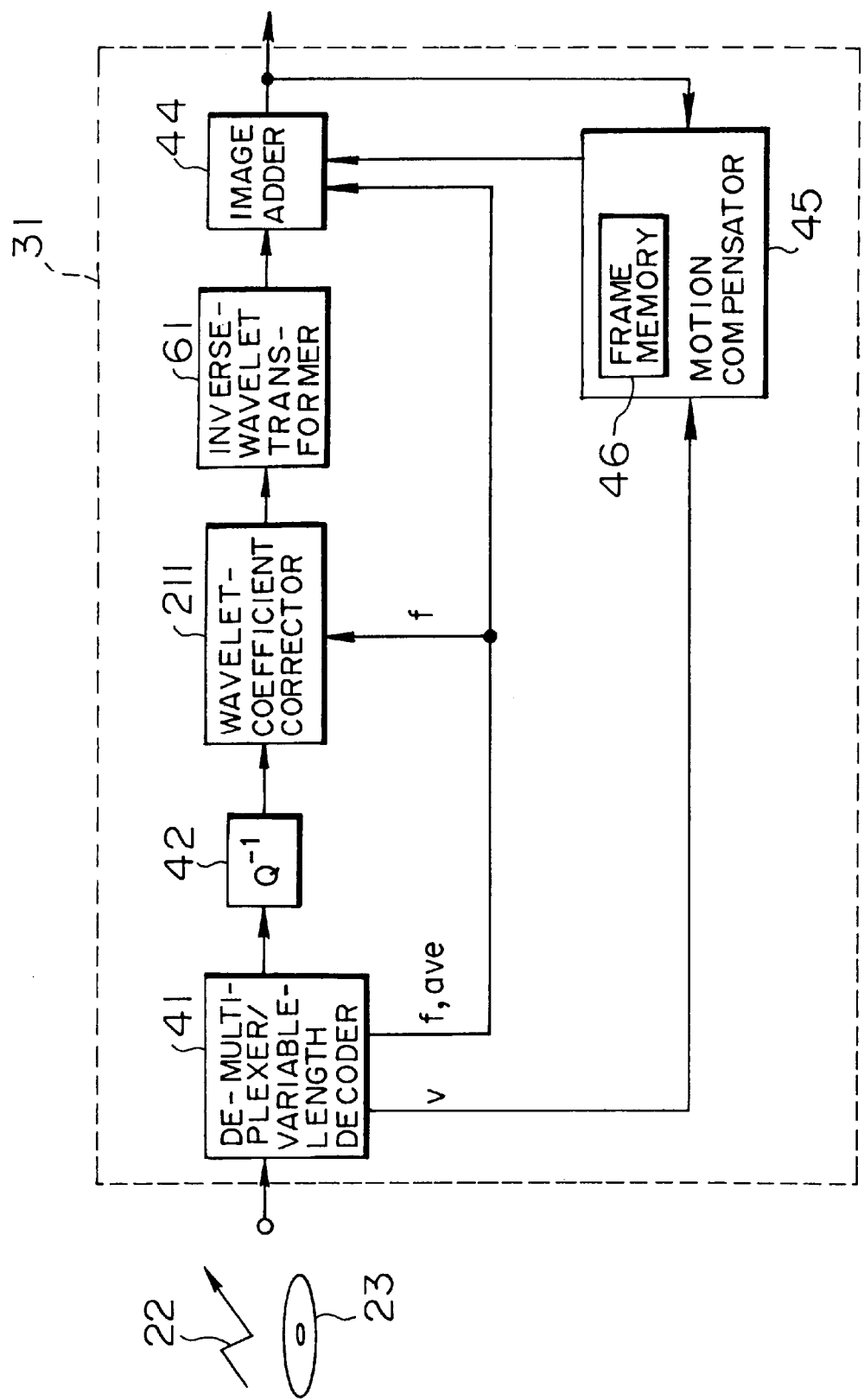
FIG. 12 is a block diagram illustrating the configuration of a motion-picture decoding apparatus according to the fifth embodiment of the present invention.

FIGS. 11 and 12 illustrate the configuration of a fifth embodiment of the present invention. The fifth embodiment is configured basically in a manner similar to the third embodiment illustrated in FIGS. 6 and 8. The former differs from the latter, however, in that a flag f detected in the differential-image generator 13 or the de-multiplexer/variable-length decoder 41 is input into the wavelet coefficient corrector 201 or 211. If the flag f indicates that the coefficient to be processed corresponds to an intra-macroblock, a wavelet-coefficient correction expressed by equation (19) in the third embodiment or an isolated-coefficient correction expressed by equation (20) in the fourth embodiment is not executed on the coefficient.

A determination as to whether a wavelet coefficient corresponds to an intra-macroblock may be made as follows. When the designated wavelet coefficient is represented by $c''(i,j,B,L)$, it may be located at the position of an image indicated by the following equation (24).

[Mathematical equation 5]

$$(i \times 2^{(LAYER-M)}, j \times 2^{(LAYER-M)})$$ (24)

$$M = \begin{cases} L-1 & \ldots & L > 0 \\ 0 & \ldots & L = 0 \end{cases}$$

Then, it can be judged whether the position of the coefficient on the image is contained in an intra-macroblock. The wavelet domain is divided into several layers, and there are three layers in the embodiment shown in FIG. 7.

In reality, however, on an inverse-wavelet transformed image, the coefficient $c''(i,j,B,L)$ influences not only the position represented by expression (24), but also pixels in a region around the above position, in accordance with the lengths of the wavelet filters. Thus, the flags f in the positions adjacent to the position represented by expression (24) may be used to determine whether the coefficient c"(i,j,B,L) is contained in an intra-macroblock. For example, the types of macroblocks in the adjacent positions may be checked, and whether the wavelet coefficient is included in an intra-macroblock or an inter-macroblock may be determined by a larger number of the detected macroblocks. Alternatively, the attenuation coefficients a[L] may be controlled according to the following equation (25) by the ratio of the number of intra-macroblocks to the number of inter-macroblocks in an adjacent region:
[Mathematical expression 6]

$$a'[L] = \frac{Nintra}{Nintra + Ninter}(1 - a[L]) + a[L] \quad (25)$$

where Nintra and Ninter represent the number of intra-macroblocks and the number of inter-macroblocks, respectively, in an adjacent region.

In this manner, a suitable amount of correction can be made to the block mode (such as an intra-block), which is used in the motion compensation by known block matching.

Figure 13:
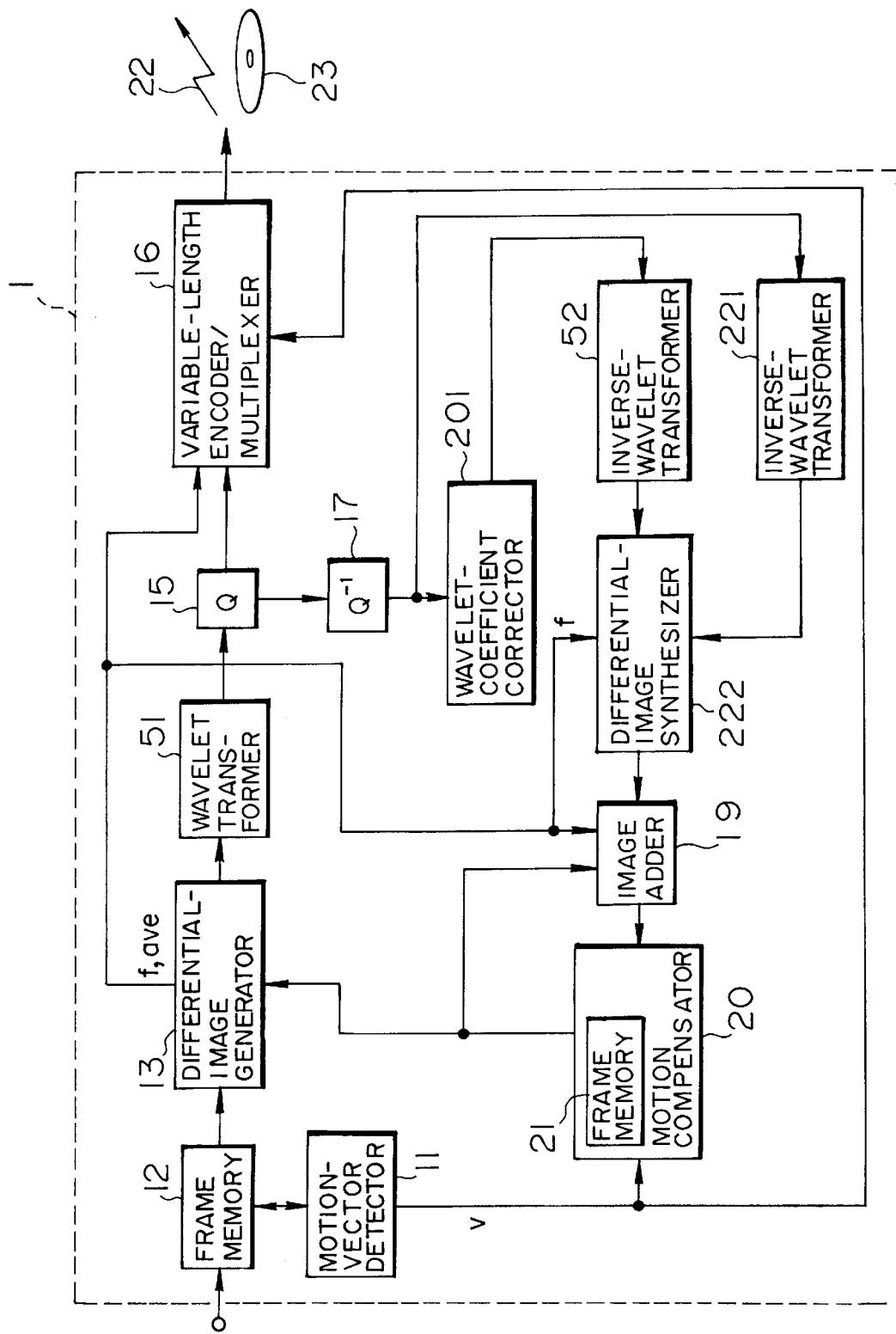
FIG. 13 is a block diagram illustrating the configuration of a motion-picture encoding apparatus according to a sixth embodiment of the present invention.
Figure 14:
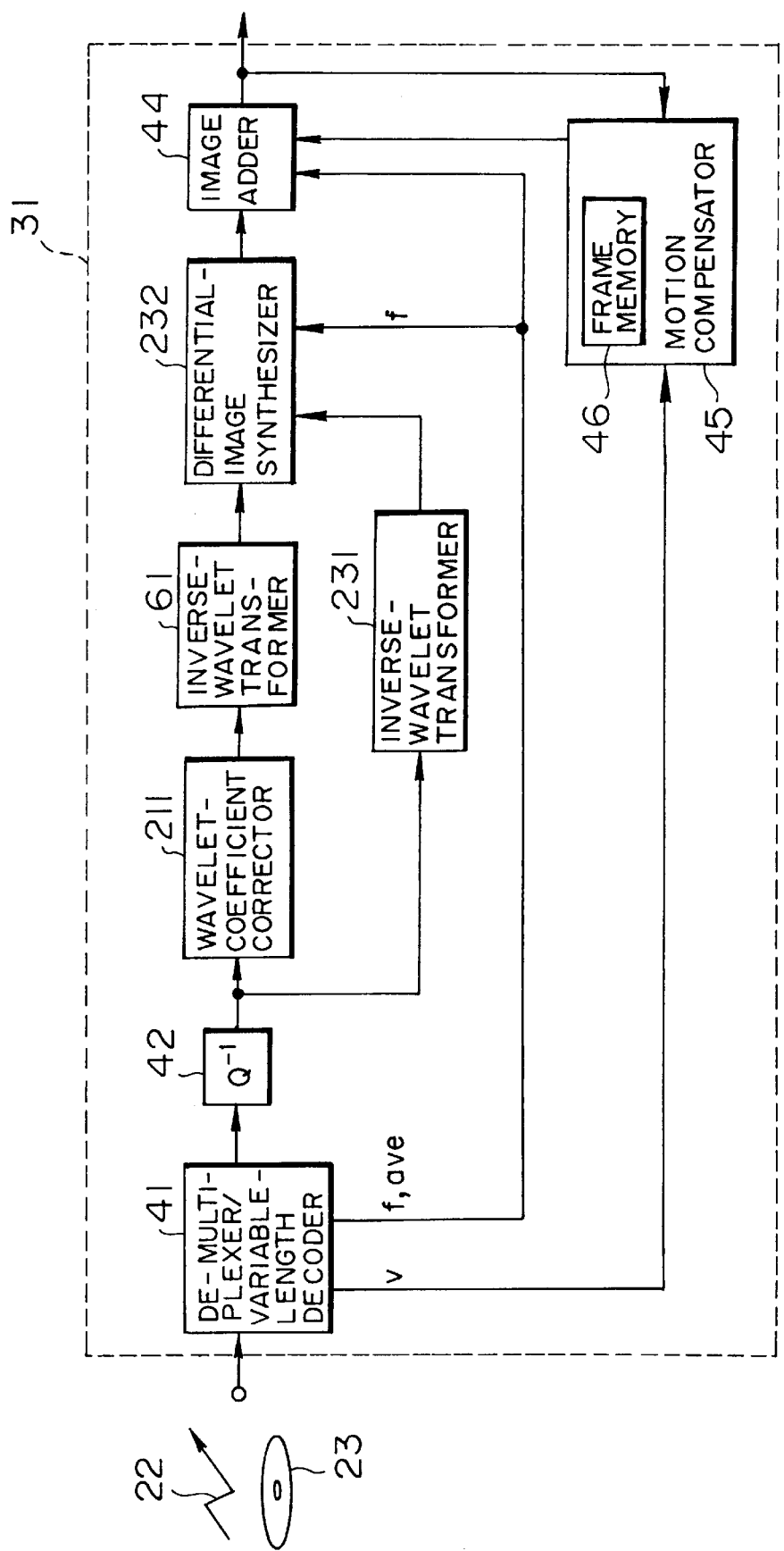
FIG. 14 is a block diagram illustrating the configuration of a motion-picture decoding apparatus according to the sixth embodiment of the present invention.

FIGS. 13 and 14 illustrate the configuration of a sixth embodiment of the present invention. In the embodiment shown in FIG. 13, a second inverse-wavelet transformer 221, which directly inverse-wavelet transforms an output of the de-quantizer 17, is added to the embodiment shown in FIG. 6. Further an output of the first inverse-wavelet transformer 52 and an output of the second inverse-wavelet transformer 221 are input into a differential-image synthesizer 222. The flag f output from the differential-image generator 13 is also input into the differential-image synthesizer 222.

The differential-image synthesizer 222 switches between the data from the first inverse-wavelet transformer 52 and the data from the second inverse-wavelet transformer 221 in a unit of macroblock in accordance with the flag f sent from the differential-image generator 13. More specifically, when the flag f indicates an intra-macroblock, the synthesizer 222 selects the uncorrected data from the second inverse-wavelet transformer 221. On the other hand, if the flag f represents an inter-macroblock, the corrected data from the first inverse-wavelet transformer 52 is selected.

FIG. 14 illustrates the configuration of a motion-picture decoding apparatus 31 which decodes the bit stream output from the encoding apparatus 1 shown in FIG. 13. The configuration of the decoding apparatus 31 illustrated in FIG. 14 is fundamentally similar to that of the decoding apparatus 31 shown in FIG. 8. The former apparatus is different, however, from the latter apparatus in the following respects. The decoding apparatus 31 shown in FIG. 14, as well as the encoding apparatus 1 shown in FIG. 13, has an inverse-wavelet transformer 231 which directly inverse-wavelet transforms the data of the de-quantizer 42 and a differential-image synthesizer 232 which selectively outputs the data of the inverse-wavelet transformer 61. Supplied to the synthesizer 232 is a flag f output from the de-multiplexer/variable-length decoder 41. Namely, the decoding operation performed by the decoding apparatus 31 shown in FIG. 14 is similar to the encoding operation by the encoding apparatus 1 illustrated in FIG. 13, and an explanation thereof will thus be omitted.

As discussed above, an uncorrected differential image and a corrected differential image can be switched in accordance with the block mode (such as an intra-block), which is employed in the motion compensation by known block matching. As a consequence, an appropriate correcting operation can be performed in response to the mode.

Figure 15:
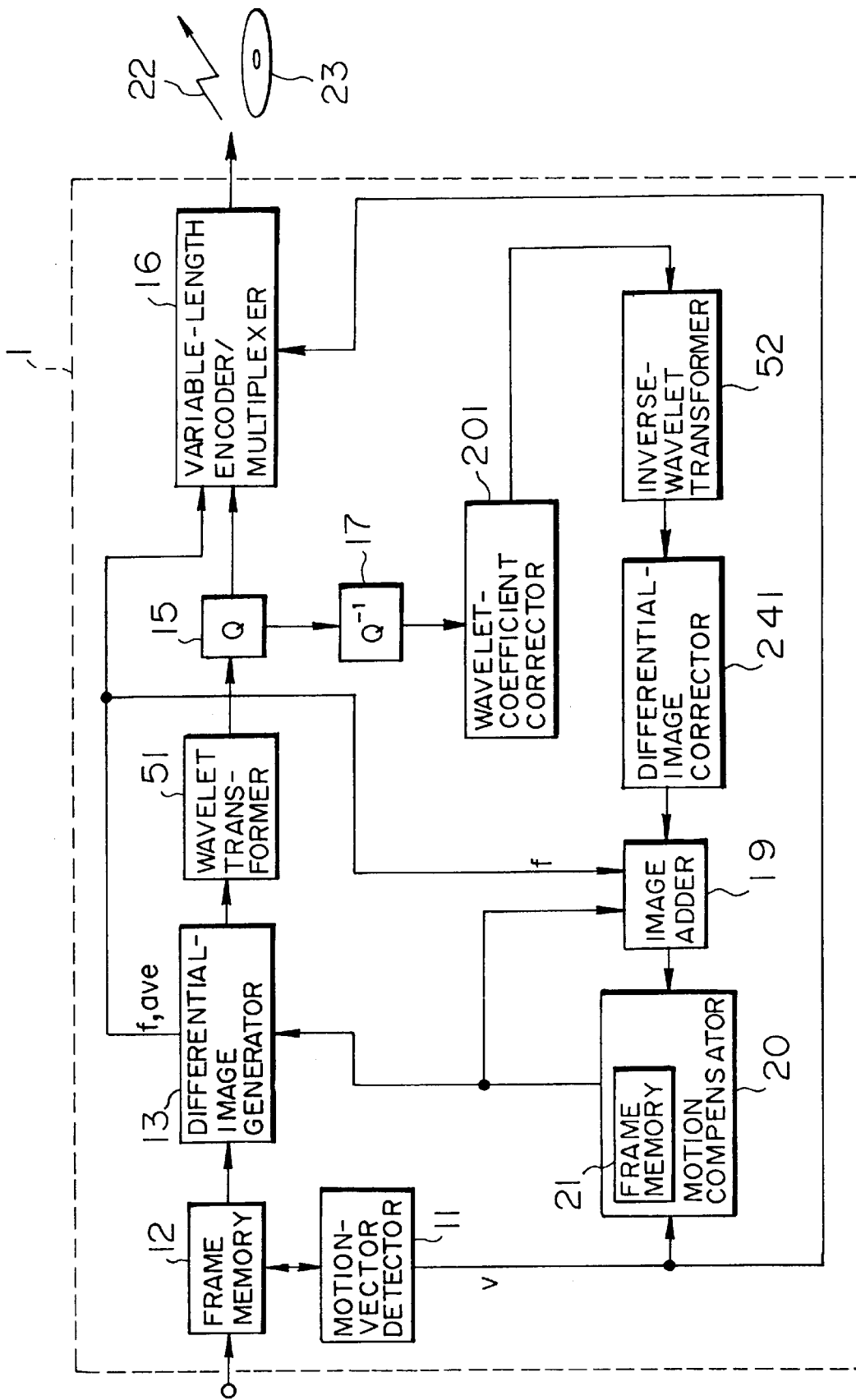
FIG. 15 is a block diagram illustrating the configuration of a motion-picture encoding apparatus according to a seventh embodiment of the present invention.

The configuration of a seventh embodiment of the present invention is shown in FIG. 15. In this embodiment a differential-image corrector 241, which corrects the inverse-wavelet transformed data, is added to the configuration of the first embodiment shown in FIG. 6. The differential-image corrector 241 performs the correcting operation expressed by the following equation when the absolute value of the output do of the inverse-wavelet transformer 52 is smaller than a predetermined threshold T4:

$$d'''=r \times d'' \quad (26)$$

where r is a real number in a range expressed by $0 \leq r \leq 1.0$. In equation (26) the differential data do reproduced by the inverse-wavelet transform is attenuated by an attenuation coefficient r. This corrector 241 may be interposed between the first inverse-wavelet transformer 52 and the differential-image synthesizer 222 of the fourth embodiment shown in FIG. 13.

Figure 16:
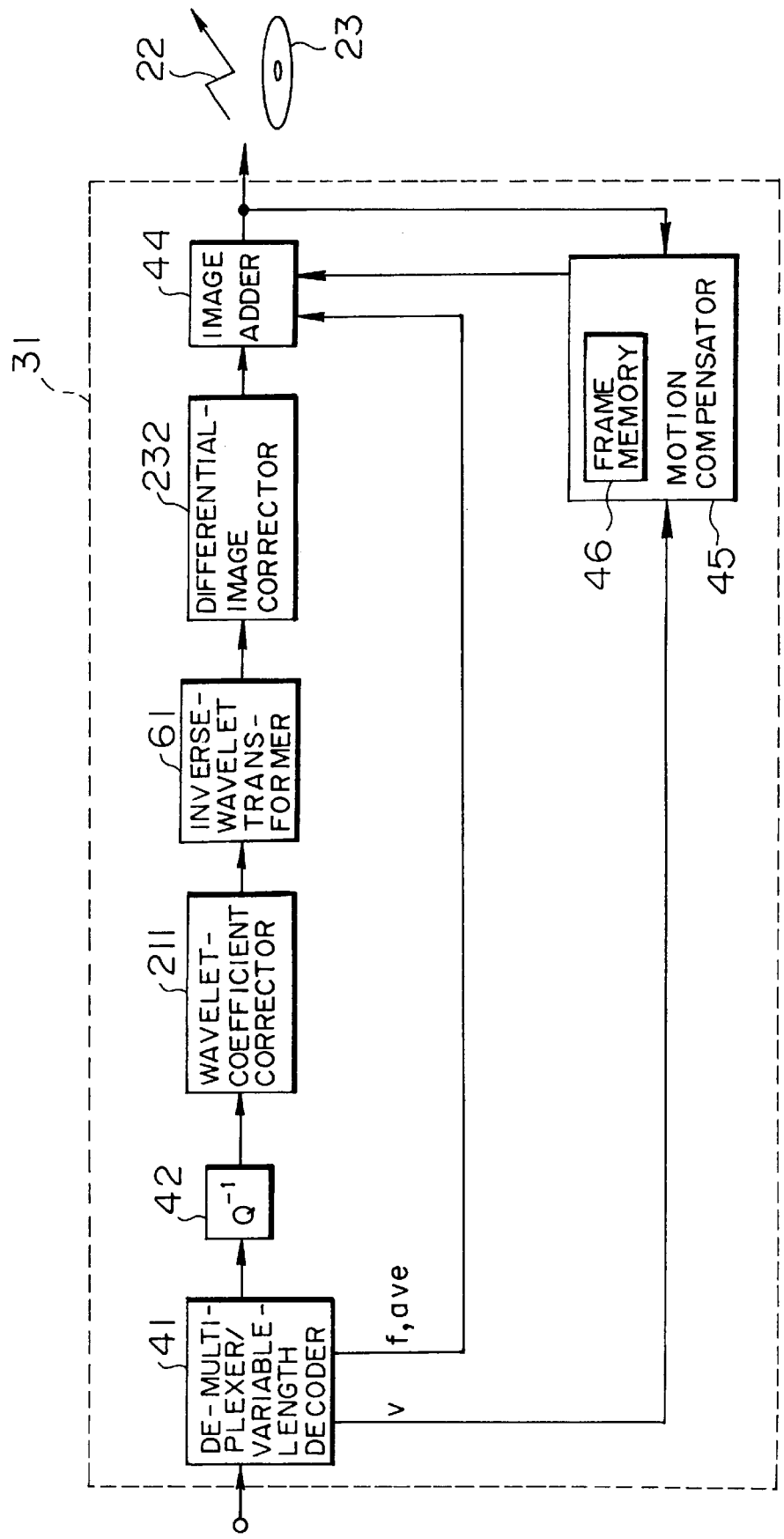
FIG. 16 is a block diagram illustrating the configuration of a motion-picture decoding apparatus according to the seventh embodiment of the present invention.

FIG. 16 illustrates the configuration of a motion-picture decoding apparatus 31 which decodes the bit stream output from the encoding apparatus 1 shown in FIG. 15. In this decoding apparatus 31, a differential-image corrector 251 is disposed between an inverse-wavelet transformer 61 and an image adder 44 in correspondence with the encoding apparatus 1 shown in FIG. 15. The configuration and the operation of the differential-image corrector 251 are similar to those of the corrector 241 shown in FIG. 15, and an explanation thereof will thus be omitted.

According to the above description, corrections in a wavelet domain is combined with corrections in a spatial domain (on an inverse-wavelet transformed differential image), thereby suppressing temporal jitter of motion pictures with higher precision.

Figure 17:
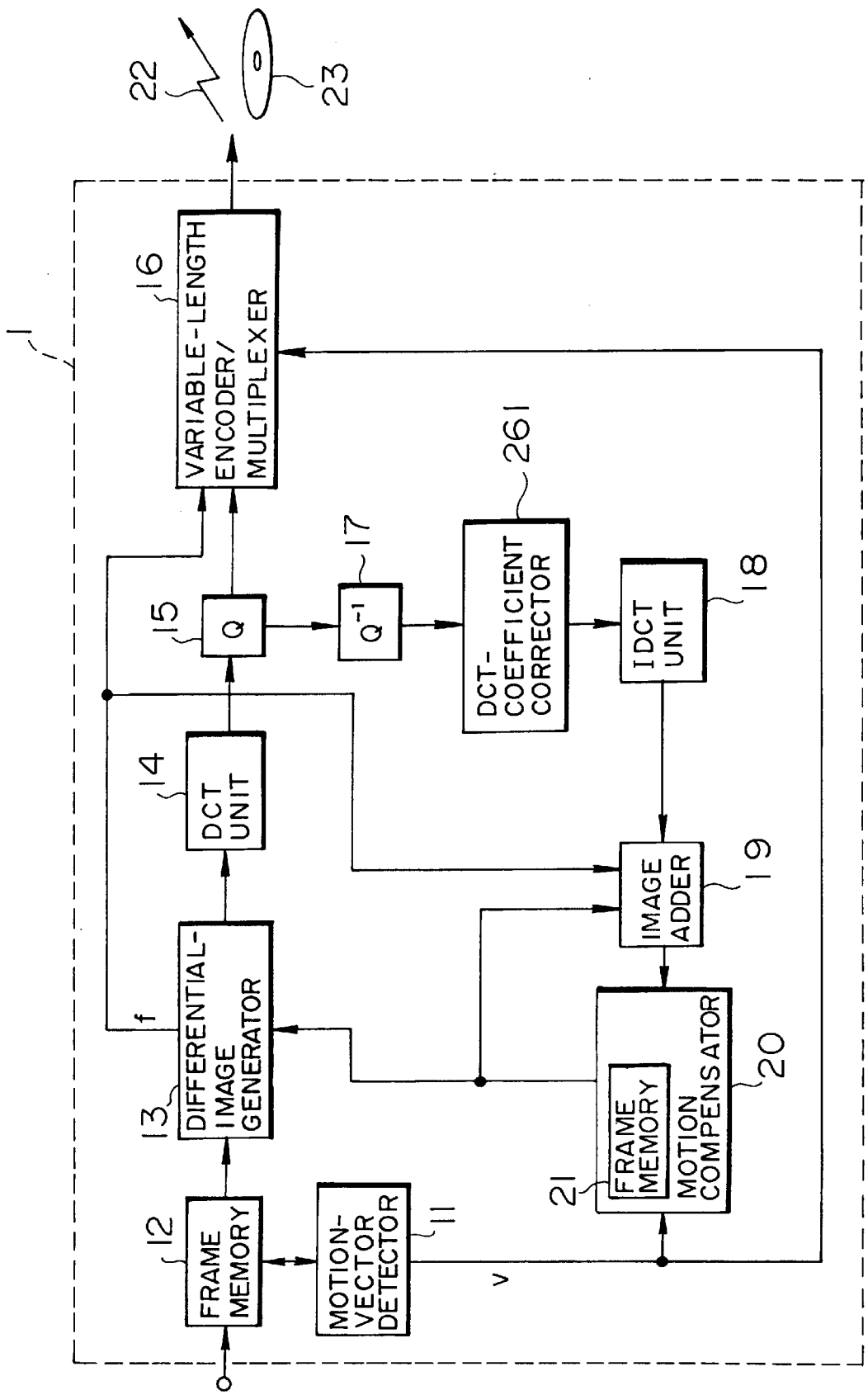
FIG. 17 is a block diagram illustrating the configuration of a motion-picture encoding apparatus according to an eighth embodiment of the present invention.
Figure 18:
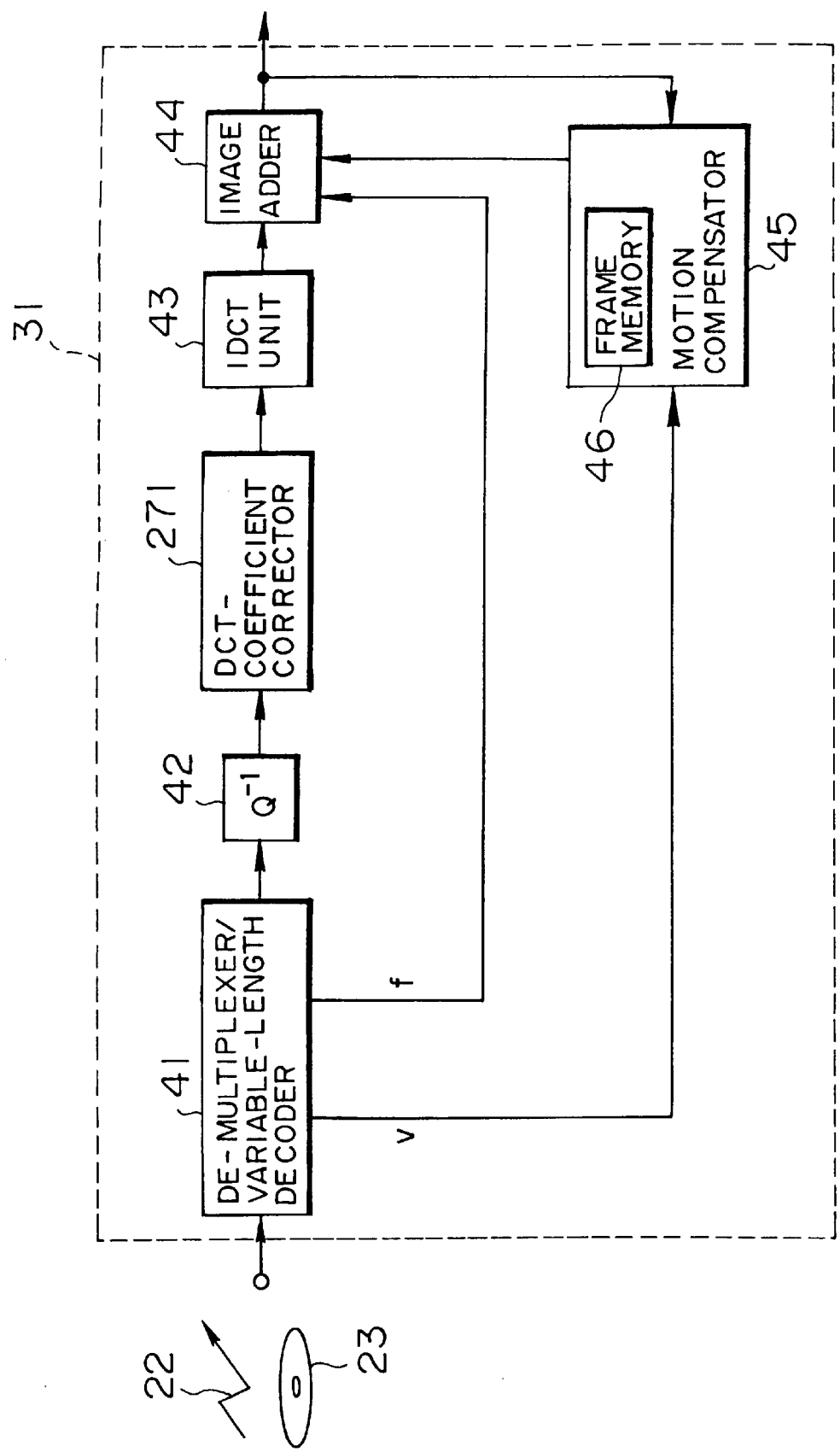
FIG. 18 is a block diagram illustrating the configuration of a motion-picture decoding apparatus according to the eighth embodiment of the present invention.

FIGS. 17 and 18 respectively illustrate the configuration of a motion-picture encoding apparatus 1 and a motion-picture decoding apparatus 31 according to an eighth embodiment of the present invention. Although the configurations of the encoding apparatus 1 and the decoding apparatus 31 are basically similar to those of the apparatuses 1 and 31 shown in FIGS. 28 and 29, the former apparatuses 1 and 31 differ from the latter apparatuses 1 and 31 in the following respects. In the encoding apparatus 1 shown in FIG. 17, a DCT-coefficient corrector 261 is interposed between the de-quantizer 17 and the IDCT unit 18. In the decoding apparatus 31 illustrated in FIG. 18, a DCT-coefficient corrector 271 is connected between the de-quantizer 42 and the IDCT unit 43.

Figure 21:
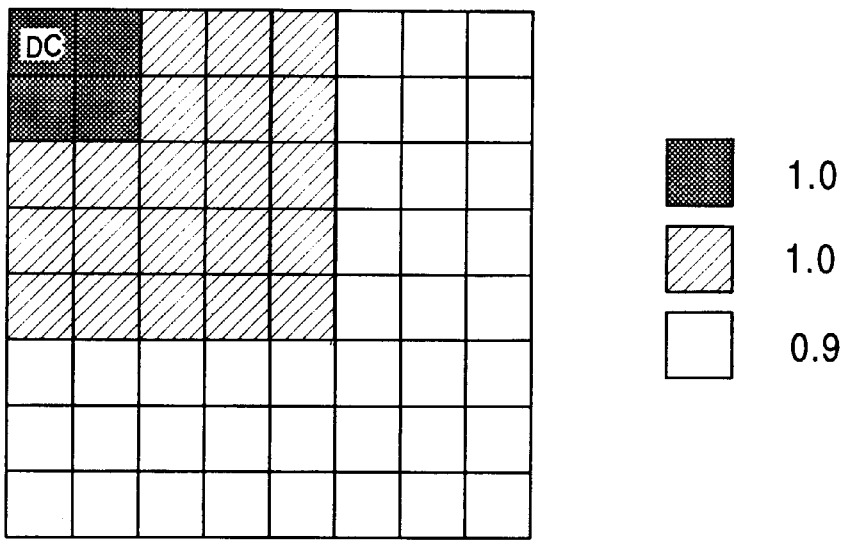
FIG. 21 illustrates attenuation coefficients for intra-frame DCT coefficients.

DCT-coefficient corrections are performed by the DCT-coefficient correctors 261 and 271 according to equation (19) in a manner, in principle, similar to wavelet-coefficient corrections made by the wavelet-coefficient correctors 201 and 211 shown in FIGS. 6 and 8 of the third embodiment. In regard to the attenuation coefficients a[L], the same coefficients a[L] (a[L]=0.67) may be, as shown in FIG. 19, used for all the DCT coefficients of motion-compensated inter-frames. Alternatively, if it is known that the DCT-coefficient distribution varies between the frequency levels due to the characteristics of input data, different attenuation coefficients (a[L]=0.8, 0.67, 0.5) may be used according to the frequency levels, as illustrated in FIG. 20. Conversely, for intra-frames, which have not been motion-compensated, attenuation coefficients different from those for inter-frames, such as the coefficients (a[L]=1.0, 1.0, 0.9) may be used, as illustrated in FIG. 21.

Figure 22:
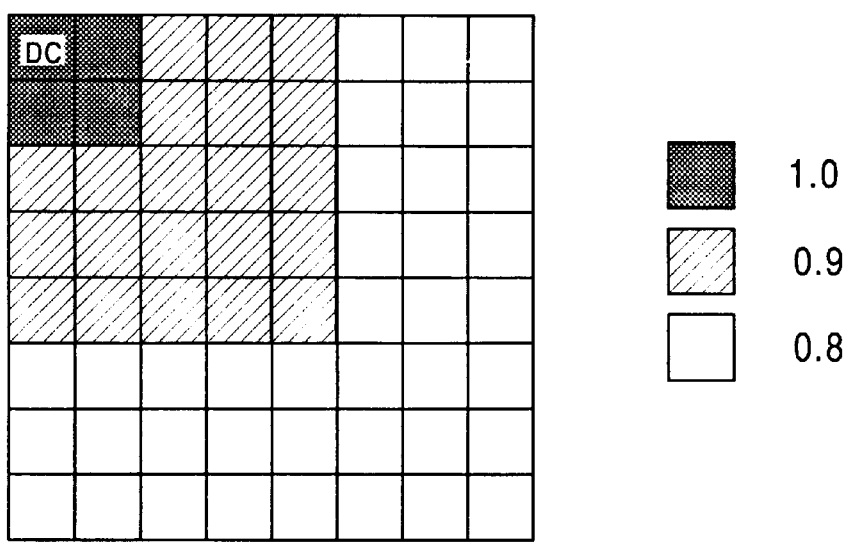
FIG. 22 illustrates attenuation coefficients for DCT coefficients of intra-frame chrominance components.

Although no distinction is made between the attenuation coefficients for luminance components and those for chrominance components for correcting DCT coefficients as well as for correcting wavelet coefficient, different attenuation coefficients may be used. For example, the attenuation coefficients (a[L]=1.0, 1.0, 0.9) shown in FIG. 21 may be employed for intra-frame luminance components, while the attenuation coefficients (a[L]=1.0, 0.9, 0.8) shown in FIG. 22 may be used for intra-frame chrominance components.

As has been explained above, there is a difference in the distribution of the wavelet coefficients or the DCT coefficients between intra-frames and inter-frames. Accordingly, different attenuation coefficients may be used for intra-frames and inter-frames, thereby enabling suitable attenuation processing depending on the type of frame. Moreover, different attenuation coefficients may be employed for luminance components and chrominance components, thereby making it possible to perform appropriate attenuation processing depending on the type of component.

Although in the eighth embodiment the linear de-quantizer 17 or 42 and the DCT-coefficient corrector 261 or 271 are employed, a single de-quantizer may double as a DCT-coefficient corrector, as described in the first embodiment.

Figure 23:
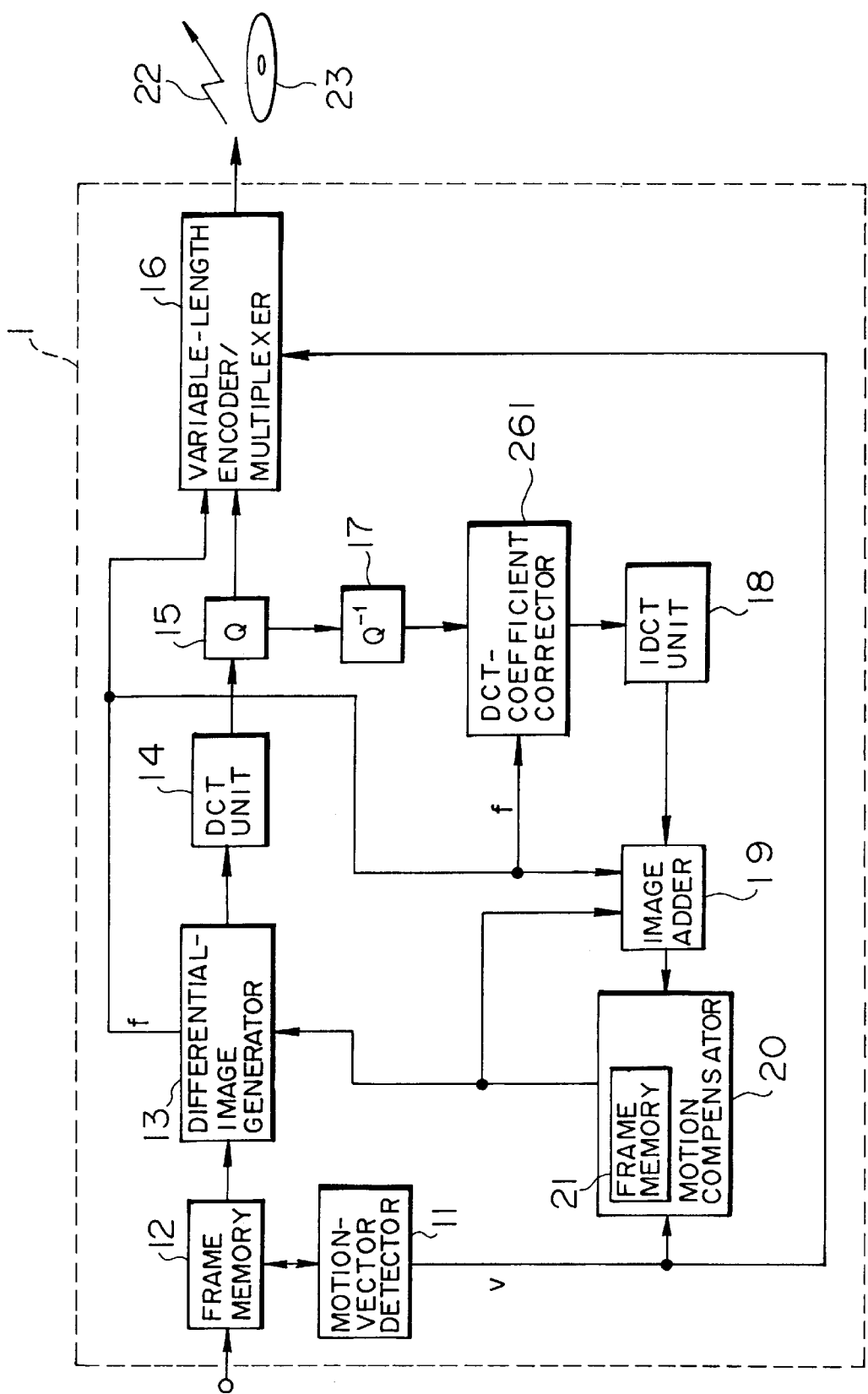
FIG. 23 is a block diagram illustrating the configuration of a motion-picture encoding apparatus according to a ninth embodiment of the present invention.
Figure 24:
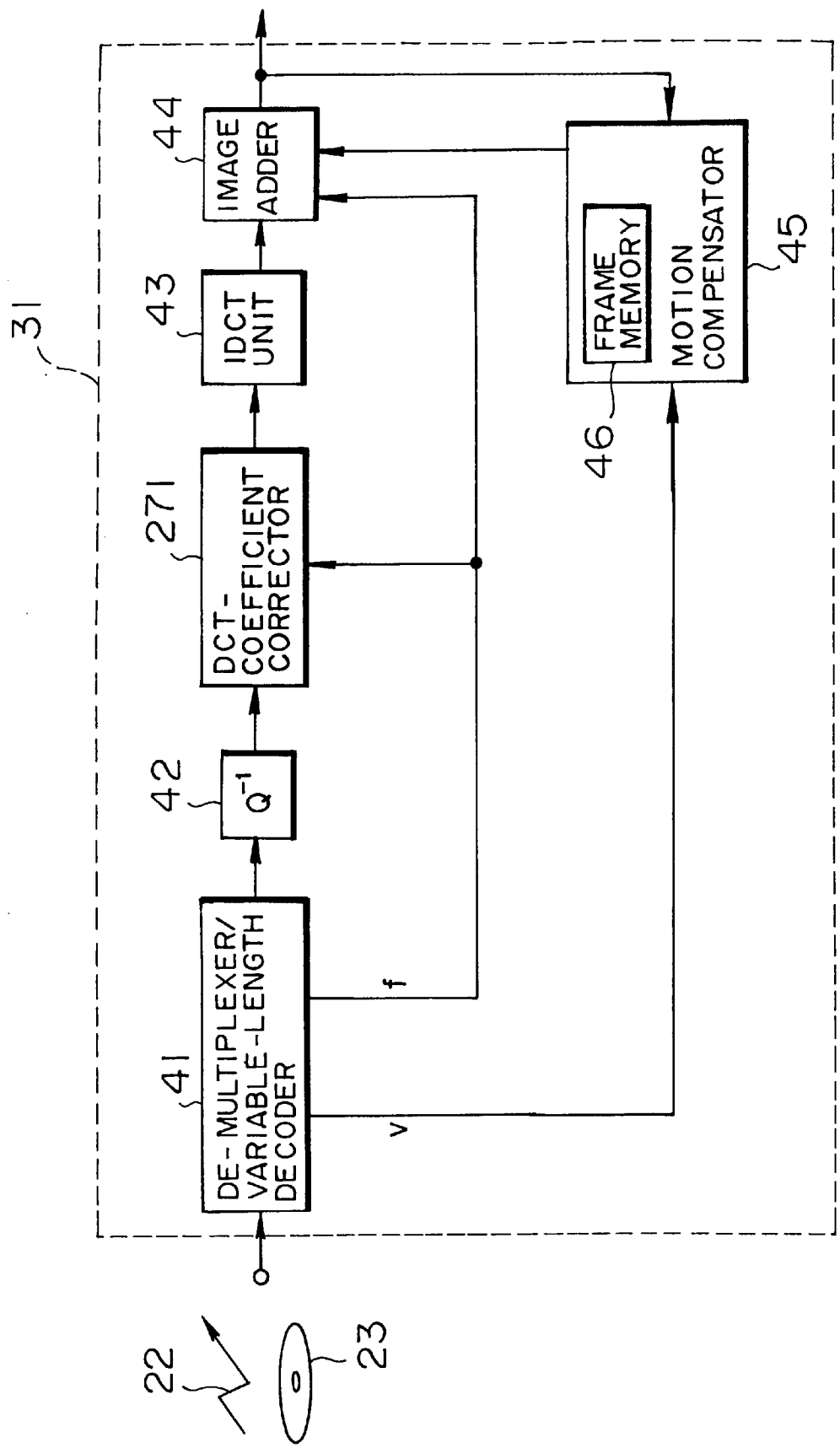
FIG. 24 is a block diagram illustrating the configuration of a motion-picture decoding apparatus according to the ninth embodiment of the present invention.
Figure 25:
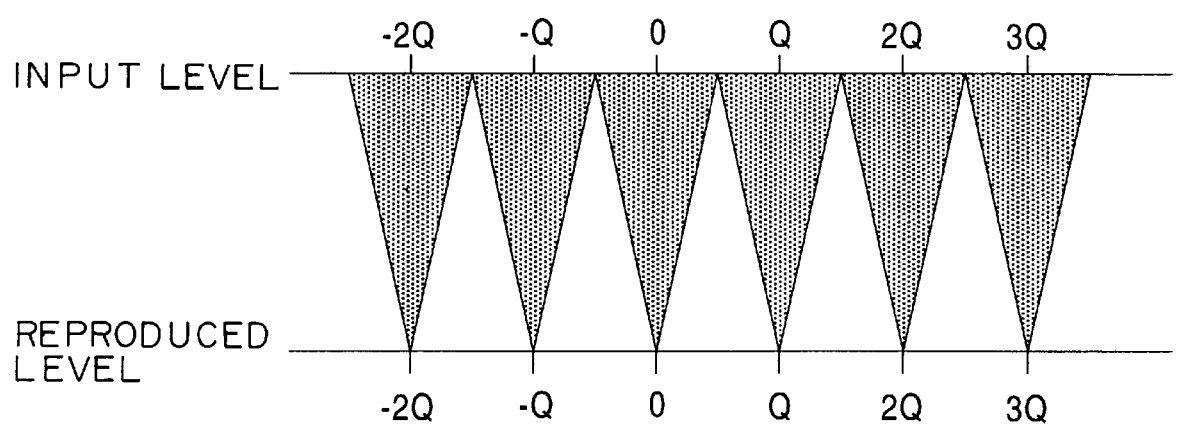
FIG. 25 illustrates the relationship between the input level and the reproduced level resulting from the linear quantizing and de-quantizing operation.
Figure 26:
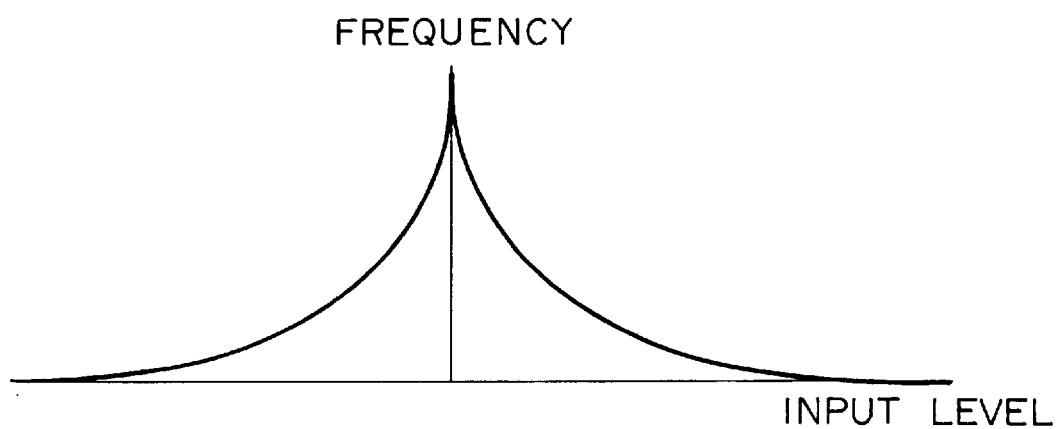
FIG. 26 illustrates the data distribution.
Figure 27:
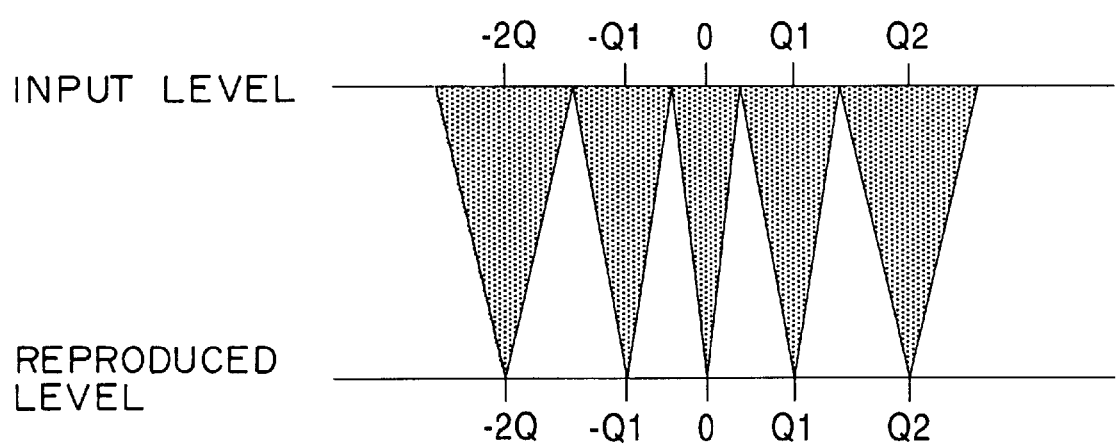
FIG. 27 illustrates the relationship between the input level and the reproduced level resulting from the non-linear quantizing and de-quantizing operation.
Figure 28:
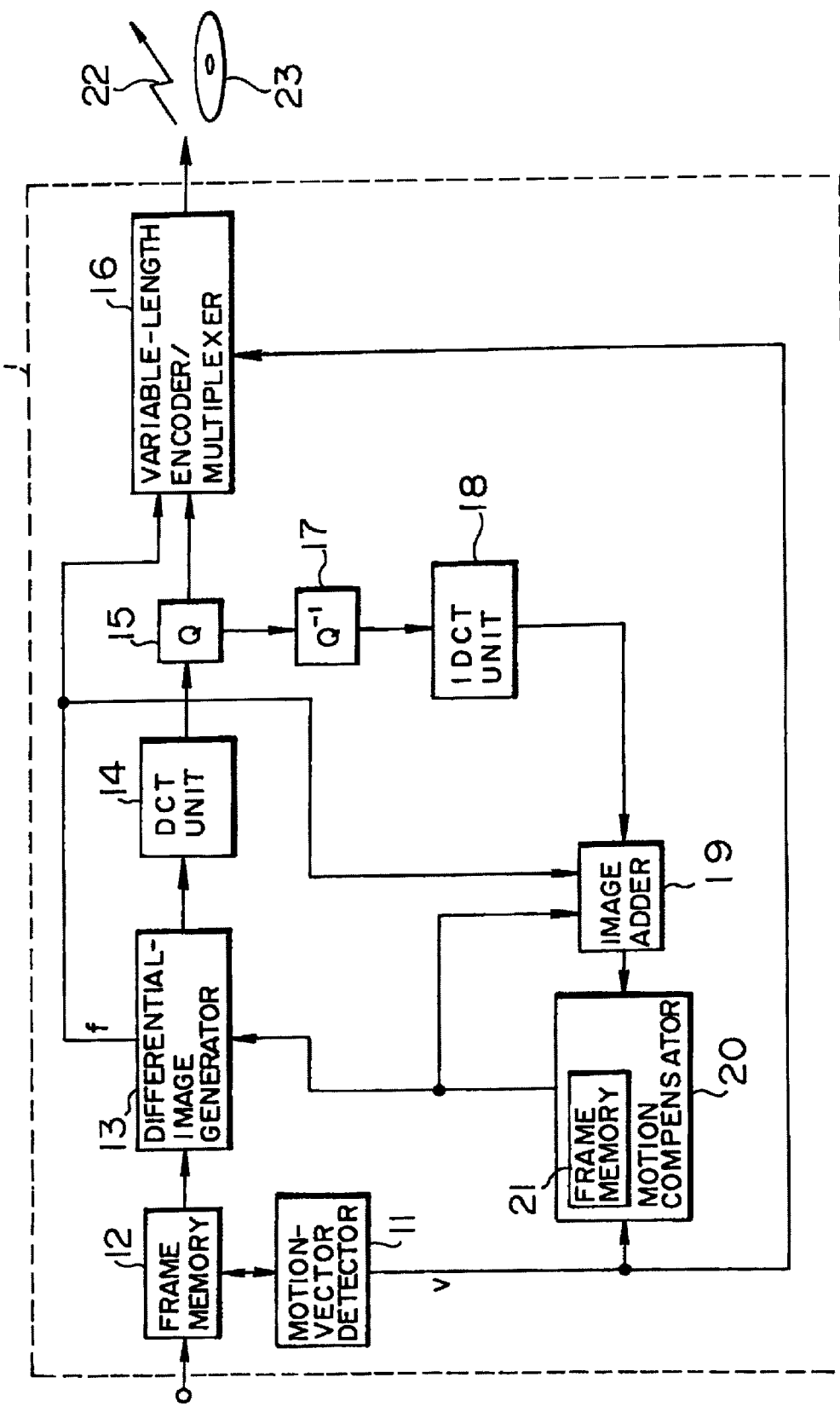
FIG. 28 is a block diagram illustrating the configuration of a conventional motion-picture encoding apparatus.
Figure 29:
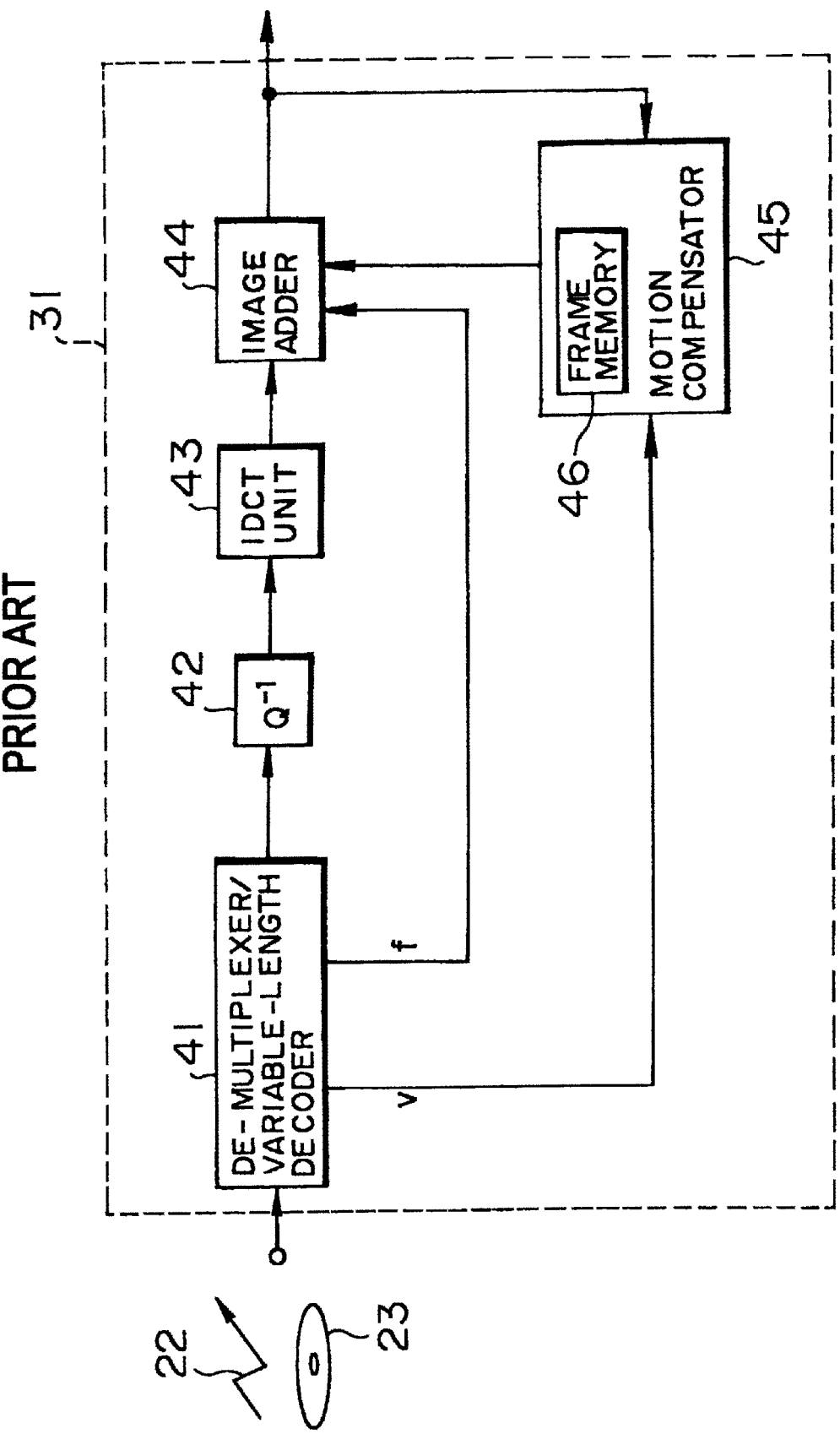
FIG. 29 is a block diagram illustrating the configuration of a conventional motion-picture decoding apparatus.

The configurations of the motion-picture encoding apparatus 1 and the motion-picture decoding apparatus 31 according to a ninth embodiment of the present invention are illustrated in FIGS. 23 and 24, respectively. Although the configurations of the apparatuses 1 and 31 are fundamentally similar to those of the apparatuses 1 and 31 shown in FIGS. 17 and 18, the former is different from the latter in that a flag f detected by the differential-image generator 13 or the de-multiplexer/variable-length decoder 41 is input into the DCT-coefficient corrector 261 or 271.

When wavelet-coefficient transform is conducted, the relationship between wavelet coefficients and macroblocks is unclear, and a standard for defining the relationship, such as the one represented by expression (24), is thus required. On the other hand, when DCT coefficients in a unit of blocks are used, such as the case in this embodiment, it is obvious which DCT coefficients are contained in an intra-macroblock. Accordingly, only when the flag f indicates a macroblock of the type which is other than an intra-macroblock, the DCT-coefficient corrector 261 or 271 attenuates the corresponding DCT coefficient.

Although the foregoing embodiments have been explained with reference to the block diagrams, the present invention may be implemented by hardware or a software program using a CPU or memory. Accordingly, the image encoding and/or image decoding algorithms may be realized by a computer program, i.e., an image encoding program and/or an image decoding program. In this case, the computer program is recorded on a recording medium, such as a semiconductor memory or a disc, for use. Further, the image encoding program and/or the image decoding program may be supplied to a terminal via a network.

As is seen from the foregoing description, the present invention offers the following advantages.

According to the data processing method and apparatus, data is de-quantized with a quantizing step size different from the step size used for quantizing the data. Thus, quantizing errors can be decreased without increasing the amount of generated bits.

Moreover, according to the image encoding method and apparatus and the image decoding method and apparatus, the reproduced wavelet-coefficients are corrected, thereby preventing the generation of block noise and suppressing the temporal changes in the ringing phase.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image encoding apparatus for encoding input image data, said apparatus comprising:

motion-vector detecting means which detects a motion vector from the input image data;

predicted-image-data generating means which generates predicted image data of the image to be encoded in accordance with the detected motion vector;

differential-image generating means which generates differential-image data between the predicted image data and the image to be encoded;

transform means which wavelet-transforms the differential-image data generated by said differential-image generating means so as to obtain a transform coefficient for the differential-image data;

quantizing means which quantizes the transform coefficient so as to obtain a quantized transform coefficient;

de-quantizing means which de-quantizes the quantized transform coefficient so as to reproduce the transform coefficient;

transform-coefficient correcting means which corrects the reproduced transform coefficient by attenuation with a frequency dependent attenuation coefficient so as to obtain a corrected transform coefficient;

first inverse-transform means which inverse wavelet-transforms the corrected transform coefficient so as to reproduce the differential-image data; and image adding means which adds the predicted image data to the reproduced first differential-image data so as to reproduce the image data for the predicted image data of the image to be encoded.

2. An image encoding apparatus according to claim 1, wherein said differential-image generating means determines the mode in accordance with differential values between a plurality of small domains obtained by dividing the differential image, and wherein said image adding means generates the image data in accordance with the determined mode.

3. An image encoding apparatus according to claim 1, wherein said differential-image generating means determines the mode in accordance with differential values between a plurality of small domains obtained by dividing the differential image, and wherein said transform-coefficient correcting means controls the amount in which the transform coefficient is corrected in accordance with the determined mode.

4. An image encoding apparatus according to claim 1, further comprising:

second inverse-transforming means which inverse-transforms the reproduced transform coefficient so as to reproduce second differential-image data; and differential-image generating means which newly generates differential-image data from the first differential-image data and the second differential-image data, wherein said differential-image generating means determines the mode in accordance with differential values between a plurality of small domains obtained by dividing the differential image and newly generates differential-image data from the first differential-image data and the second differential-image data in accordance with the determined mode.

5. An image encoding apparatus according to claim 1, wherein said transform means performs a DCT operation on the differential-image data.

6. An image encoding apparatus according to claim 1, wherein said de-quantizing means uses a de-quantizing step smaller than the quantizing step used in the quantizing operation, said de-quantizing step being obtained by multiplying the quantizing step by a positive integer smaller than 1.

7. A decoder according to claim 6, wherein the different coefficients are used for motion-compensated inter-frame data and not-motion-compensated intra-frame data, respectively.

8. A decoder according to claim 6, wherein the different coefficients are used for luminance-component data and chrominance-component data, respectively.

9. An image encoding apparatus according to claim 1, wherein said de-quantizing means de-quantizes the quantized data with a quantizing step size different from the step size used in the quantizing operation when the absolute value of the quantized data falls outside the predetermined range.

10. A decoder according to claim 9, wherein said de-quantizing means outputs the minimum possible value of the pre-quantized data when the absolute value of the quantized data falls without the predetermined range.

11. An image encoding apparatus according to claim 3, wherein said transform-coefficient correcting means comprises a detector for detecting an isolated coefficient from the transform coefficients and a corrector for correcting the isolated coefficient.

12. An image encoding apparatus according to claim 1, wherein said transform-coefficient correcting means attenuates a transform coefficient with a predetermined attenuation coefficient when the absolute value of the transform coefficient is smaller than a predetermined threshold.

13. An image encoding apparatus according to claim 1, wherein said transform-coefficient correcting means attenuates a transform coefficient with an attenuation coefficient which corresponds to the frequency level of the transform coefficient.

14. An image encoding apparatus according to claim 1, wherein said transform-coefficient correcting means attenuates a motion-compensated inter-frame transform coefficient and a not-motion-compensated intra-frame transform coefficient with different attenuation coefficients, respectively.

15. An image encoding apparatus according to claim 1, wherein said transform-coefficient correcting means attenuates a luminance-component transform coefficient and a chrominance-component transform coefficient with different attenuation coefficients, respectively.

16. An image encoding apparatus according to claim 1, wherein said transform-coefficient correcting means attenuates a transform coefficient in a lower frequency with a larger attenuation coefficient.

17. An image encoding apparatus according to claim 1, wherein said transform-coefficient correcting means attenuates a transform coefficient in an intermediate frequency with a larger attenuation coefficient.

18. An image encoding apparatus according to claim 3, wherein said transform-coefficient correcting means corrects the given transform coefficient based on the distribution of the transform coefficients located in the corresponding positions of the respective frequency levels. of the image.

19. An image encoding apparatus according to claim 11, wherein said detector determines that the given transform coefficient is an isolated coefficient when the absolute value of the given transform coefficient is greater than a first threshold and when the absolute values of the transform coefficients located in the corresponding positions of the respective frequency levels of the image are smaller than a second threshold.

20. An image encoding apparatus according to claim 11, wherein said detector determines that the given transform coefficient is an isolated coefficient from the transform coefficients located in the corresponding positions of the respective frequency levels of the image and from the transform coefficients located in a frequency level adjacent to the given transform coefficient.

21. An image encoding apparatus according to claim 11, wherein said corrector attenuates the isolated coefficients with different attenuation coefficients in correspondence with the frequency levels of the isolated coefficients.

22. An image encoding apparatus according to claim 11, wherein said detector determines that the given transform coefficient is an isolated coefficient when the absolute value of the given transform coefficient is smaller than a first threshold and when the transform coefficients located in the corresponding positions of the respective frequency levels of the image are smaller than a second threshold, and when the absolute values of the adjacent transform coefficients located in the same frequency level as the given transform coefficient are smaller than a third threshold.

23. An image encoding apparatus according to claim 11, wherein said detector determines that the given transform coefficient is an isolated coefficient from the transform coefficients located in the corresponding positions of the respective frequency levels of the image, the transform coefficients located in a frequency level adjacent to the given transform coefficient, and the adjacent transform coefficients located in the same frequency level as the given transform coefficient.

24. An image transmitting method for encoding input image data and transmitting the encoded data, said method comprising the steps of:

detecting a motion vector from the input image data;

generating predicted image data of the image to be encoded in accordance with the detected motion vector;

generating differential-image data between the predicted image data and the image to be encoded;

wavelet-transforming the differential-image data so as to obtain a transform coefficient for the differential-image data;

quantizing the transform coefficient so as to obtain a quantized transform coefficient;

de-quantizing the quantized transform coefficient so as to reproduce the transform coefficient;

correcting the reproduced transform by attenuation with a frequency dependent attenuation coefficient so as to obtain a corrected transform coefficient;

inverse wavelet-transforming the corrected transform coefficient so as to reproduce the differential-image data;

adding the predicted image data to the reproduced differential-image data so as to reproduce the image data for the predicted image data of the image to be encoded; and transmitting the quantized transform coefficient and the encoded data including the motion vector.

25. An image transmitting method for encoding input image data and transmitting the encoded data, said method comprising the steps of:

detecting a motion vector from the input image data;

generating predicted image data of the image to be encoded in accordance with the detected motion vector;

generating differential-image data between the predicted image data and the image to be encoded;

wavelet-transforming the differential-image data so as to obtain a transform coefficient for the differential-image data;

quantizing the transform coefficient so as to obtain a quantized transform coefficient;

de-quantizing the quantized transform coefficient so as to reproduce the transform coefficient;

inverse wavelet-transforming the transform coefficient so as to reproduce the differential-image data;

correcting the reproduced differential-image data by attenuation with a frequency dependent attenuation coefficient so as to generate corrected differential-image data;

adding the predicted image data to the reproduced differential-image data so as to reproduce the image data for the predicted image data of the image to be encoded; and transmitting the encoded data including at least the quantized transform coefficient and the motion vector.

26. An image decoding apparatus for decoding encoded image data which includes at least a quantized transform coefficient and a motion vector, said apparatus comprising:

separating means which separates the quantized transform coefficient and the motion-vector;

de-quantizing means which de-quantizes the quantized transform coefficient so as to reproduce a transform coefficient;

transform-coefficient correcting means which corrects the reproduced transform coefficient by attenuation with a frequency dependent attenuation coefficient so as to obtain a corrected transform coefficient;

inverse-transform means which inverse wavelet-transforms the corrected transform coefficient so as to reproduce differential-image data;

predicted-image-data generating means which generates predicted image data in accordance with the motion vector; and image adding means which adds the predicted image data to the reproduced differential-image data.

27. An image decoding apparatus according to claim 26, wherein the encoded data contains a flag indicating a mode, and said image adding means generates the image data according to the mode.

28. An image decoding apparatus according to claim 26, wherein the encoded data contains a flag indicating a mode, and said transform-coefficient correcting means controls the amount in which the transform coefficient is corrected in accordance with the mode.

29. An image decoding apparatus according to claim 26, further comprising:

second inverse-transforming means which inverse-transforms the reproduced transform coefficient so as to reproduce second differential-image data; and differential-image generating means which newly generates differential-image data from the first differential-image data and the second differential-image data, wherein the encoded data contains a flag indicating a mode, and said differential-image generating means newly generates the differential-image data from the first differential-image data and the second differential-image data in accordance with the mode.

30. An image decoding apparatus according to claim 26, wherein the differential-image data has undergone a DCT-operation.

31. An image decoding apparatus according to claim 26, wherein said transform-coefficient correcting means comprises a detector for detecting an isolated coefficient from the transform coefficients and a corrector for correcting the isolated coefficient.

32. An image decoding apparatus according to claim 26, wherein said transform-coefficient correcting means attenuates the transform coefficient with a predetermined attenuation coefficient when the absolute value of the transform coefficient is smaller than a predetermined threshold.

33. An image decoding apparatus according to claim 26, wherein said transform-coefficient correcting means attenuates the transform coefficient with an attenuation coefficient which corresponds to the frequency level of the transform coefficient.

34. An image decoding apparatus according to claim 26, wherein said transform-coefficient correcting means attenuates a motion-compensated inter-frame transform coefficient and a not-motion-compensated intra-frame transform coefficient with different attenuation coefficients, respectively.

35. An image decoding apparatus according to claim 26, wherein said transform-coefficient correcting means attenuates a luminance-component transform coefficient and a chrominance-component transform coefficient with different attenuation coefficients, respectively.

36. An image decoding apparatus according to claim 26, wherein said transform-coefficient correcting means attenuates a transform coefficient in a lower frequency with a larger attenuation coefficient.

37. An image decoding apparatus according to claim 26, wherein said transform-coefficient correcting means attenuates a transform coefficient in an intermediate frequency with a larger attenuation coefficient.

38. An image decoding apparatus according to claim 26, wherein said transform-coefficient correcting means corrects the given transform coefficient based on the distribution of the transform coefficients located in the corresponding positions of the respective frequency levels of the image.

39. An image decoding apparatus according to claim 31, wherein said detector determines that the given transform coefficient is an isolated coefficient when the absolute value of the given transform coefficient is greater than a first threshold and when the absolute values of the transform coefficients located in the corresponding positions of the respective frequency levels of the image are smaller than a second threshold.

40. An image decoding apparatus according to claim 31, wherein said detector determines that the given transform coefficient is an isolated coefficient from the transform coefficients located in the corresponding positions of the respective frequency levels of the image and from the transform coefficients located in a frequency level adjacent to the given transform coefficient.

41. An image decoding apparatus according to claim 31, wherein said corrector attenuates the isolated coefficients with different attenuation coefficients in correspondence with the frequency levels of the isolated coefficients.

42. An image decoding apparatus according to claim 31, wherein said detector determines that the given transform coefficient is an isolated coefficient when the absolute value of the given transform coefficient is smaller than a first threshold and when the transform coefficients located in the corresponding positions of the respective frequency levels of the image are smaller than a second threshold, and when the absolute values of the adjacent transform coefficients located in the same frequency level as the given transform coefficient are smaller than a third threshold.

43. An image decoding apparatus according to claim 31, wherein said detector determines that the given transform coefficient is an isolated coefficient from the transform coefficients located in the corresponding positions of the respective frequency levels of the image, the transform coefficients located in a frequency level adjacent to the given transform coefficient, and the adjacent transform coefficients located in the same frequency level as the given transform coefficient.

44. A recording medium decodable by a decoder, said recording medium including encoded data which contains at least a quantized transform coefficient and a motion vector, said encoded data being generated by the steps of:

detecting a motion vector from the input image data;

generating predicted image data of the image to be encoded in accordance with the detected motion vector;

generating differential-image data between the predicted image data and the image to be encoded;

wavelet-transforming the differential-image data so as to obtain a transform coefficient for the differential-image data;

quantizing the transform coefficient so as to obtain a quantized transform coefficient;

de-quantizing the quantized transform coefficient so as to reproduce the transform coefficient;

correcting the reproduced transform coefficient by attenuation with a frequency dependent attenuation coefficient so as to obtain a corrected transform coefficient;

inverse wavelet-transforming the corrected transform coefficient so as to reproduce the differential-image data; and adding the predicted image data to the reproduced differential-image data so as to reproduce the image data for the predicted image data of the image to be encoded.

45. A recording medium decodable by a decoder, said recording medium including encoded data which contains at least a quantized transform coefficient and a motion vector, said encoded data being generated by the steps of:

detecting a motion vector from the input image data;

generating predicted image data of the image to be encoded in accordance with the detected motion vector;

generating differential-image data between the predicted image data and the image to be encoded;

wavelet-transforming the differential-image data so as to obtain a transform coefficient for the differential-image data;

quantizing the transform coefficient so as to obtain a quantized transform coefficient;

de-quantizing the quantized transform coefficient so as to reproduce the transform coefficient;

inverse wavelet-transforming the transform coefficient so as to reproduce the differential-image data;

correcting the reproduced differential-image data by attenuation with a frequency dependent attenuation coefficient so as to obtain a corrected differential-image data; and adding the predicted image data to the reproduced differential-image data so as to reproduce the image data for the predicted image data of the image to be encoded.

* * * * *